(12) United States Patent
Mitani et al.

(10) Patent No.: US 12,261,995 B2
(45) Date of Patent: Mar. 25, 2025

(54) INFORMATION PROCESSING APPARATUS, INFORMATION PROCESSING METHOD, PROGRAM, AND DISPLAY APPARATUS

(71) Applicant: SONY GROUP CORPORATION, Tokyo (JP)

(72) Inventors: Satoshi Mitani, Kanagawa (JP); Yuji Nakahata, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/040,852

(22) PCT Filed: Jul. 26, 2021

(86) PCT No.: PCT/JP2021/027480
§ 371 (c)(1),
(2) Date: Feb. 7, 2023

(87) PCT Pub. No.: WO2022/034781
PCT Pub. Date: Feb. 17, 2022

(65) Prior Publication Data
US 2023/0300315 A1    Sep. 21, 2023

(30) Foreign Application Priority Data
Aug. 14, 2020    (JP) ................................ 2020-137146

(51) Int. Cl.
*H04N 13/388*    (2018.01)
*H04N 13/243*    (2018.01)

(52) U.S. Cl.
CPC ......... *H04N 13/388* (2018.05); *H04N 13/243* (2018.05)

(58) Field of Classification Search
CPC .... G06T 19/00; H04N 13/243; H04N 13/388; H04N 9/3141; H04N 9/3185; G09G 3/001
(Continued)

(56) References Cited

U.S. PATENT DOCUMENTS

| 2018/0182163 | A1* | 6/2018 | Tung | G06T 7/564 |
| 2019/0364265 | A1 | 11/2019 | Matsunobu et al. | |
| 2019/0391313 | A1 | 12/2019 | Nakamura et al. | |

FOREIGN PATENT DOCUMENTS

| JP | 2002-031794 | | 1/2002 |
| JP | 2002031794 A | * | 1/2002 |

(Continued)

OTHER PUBLICATIONS

Nakamura et al.(Machine translation of WO 2018163945 A1) (Year: 2018).*

(Continued)

*Primary Examiner* — Christopher S Kelley
*Assistant Examiner* — Ana Picon-Feliciano
(74) *Attorney, Agent, or Firm* — SHERIDAN ROSS P.C.

(57) ABSTRACT

An information processing apparatus according to an embodiment of the present technology includes an image acquisition section and an image generation section. The image acquisition section acquires a captured image, the captured image being captured by a camera section that performs imaging in all directions from a single imaging point in a virtual space. The image generation section generates, on the basis of the captured image, a display image to be displayed on a display including an outward display surface capable of being observed from all directions of a real space.

20 Claims, 20 Drawing Sheets

(58) Field of Classification Search
USPC .......................................................... 348/51
See application file for complete search history.

(56) References Cited

FOREIGN PATENT DOCUMENTS

| JP | 2010-048897 | 3/2010 | | |
|----|----|----|----|----|
| JP | 2013-075104 | 4/2013 | | |
| JP | 2017-156602 | 9/2017 | | |
| JP | 2017156602 A * | 9/2017 | | |
| WO | WO 2017/203709 | 11/2017 | | |
| WO | WO 2018/147329 | 8/2018 | | |
| WO | WO 2018/163945 | 9/2018 | | |
| WO | WO-2018163945 A1 * | 9/2018 | ............... | G02B 5/32 |
| WO | WO 2020/080111 | 4/2020 | | |
| WO | WO 2020/110760 | 6/2020 | | |

OTHER PUBLICATIONS

Nioka(Machine translation of JP 2017156602A) (Year: 2017).*
Matsui(Machine translation of JP 2002031794 A) (Year: 2002).*
International Search Report and Written Opinion prepared by the Japan Patent Office on Oct. 11, 2021, for International Application No. PCT/JP2021/027480, 3 pgs.

* cited by examiner

A

B

INFORMATION PROCESSING APPARATUS, INFORMATION PROCESSING METHOD, PROGRAM, AND DISPLAY APPARATUS

CROSS REFERENCE TO RELATED APPLICATIONS

This application is a national stage application under 35 U.S.C. 371 and claims the benefit of PCT Application No. PCT/JP2021/027480, having an international filing date of 26 Jul. 2021, which designated the United States, which PCT application claimed the benefit of Japanese Patent Application No. 2020-137146, filed 14 Aug. 2020, the entire disclosures of each of which are incorporated herein by reference.

TECHNICAL FIELD

The present technology relates to an information processing apparatus, an information processing method, a program, and a display apparatus that generate video content or the like.

BACKGROUND ART

Patent Literature 1 describes a game apparatus that displays a video of a virtual space. In such a game apparatus, a plurality of display surfaces is provided to the inner side surface of a recess portion provided to the apparatus. An image of a virtual space (under the sea or the like), which is imaged by a corresponding virtual camera, is displayed on each display surface. This makes it possible for players to view the continuous images of the virtual space by looking into the recess portion surrounded by the display surfaces from above (paragraphs [0018], [0019], and of the specification, FIGS. 1 and 5, and the like of Patent Literature 1).

CITATION LIST

Patent Literature

Patent Literature 1: Japanese Patent Application Laid-open No. 2013-75104

DISCLOSURE OF INVENTION

Technical Problem

In recent years, a cylindrical display or the like capable of displaying images in all directions of 360° has been developed, and a technique of easily generating content to be displayed on such a display has been expected.

In view of the circumstances as described above, it is an object of the present technology to provide an information processing apparatus, an information processing method, a program, and a display apparatus that are capable of easily generating display content in which images can be displayed in all directions.

Solution to Problem

In order to achieve the above object, an information processing apparatus according to an embodiment of the present technology includes an image acquisition section and an image generation section.

The image acquisition section acquires a captured image, the captured image being captured by a camera section that performs imaging in all directions from a single imaging point in a virtual space.

The image generation section generates, on the basis of the captured image, a display image to be displayed on a display including an outward display surface capable of being observed from all directions of a real space.

In such an information processing apparatus, a display image to be displayed on an outward display surface capable of being observed from all directions of a real space is generated using an output of a camera section that performs imaging in all directions from a single imaging point in a virtual space. As described above, use of the images captured by performing imaging in all directions of the virtual space from one point makes it possible to easily generate display content in which images can be displayed in all directions.

An information processing method according to an embodiment of the present technology is an information processing method executed by a computer system and includes: acquiring a captured image, the captured image being captured by a camera section that performs imaging in all directions from a single imaging point in a virtual space; and generating, on the basis of the captured image, a display image to be displayed on a display including an outward display surface capable of being observed from all directions of a real space.

A program according to an embodiment of the present technology causes a computer system to execute the steps of: acquiring a captured image, the captured image being captured by a camera section that performs imaging in all directions from a single imaging point in a virtual space; and generating, on the basis of the captured image, a display image to be displayed on a display including an outward display surface capable of being observed from all directions of a real space.

A display apparatus according to an embodiment of the present technology includes a display, an image acquisition section, and an image generation section.

The display includes an outward display surface capable of being observed from all directions in a real space.

The image acquisition section acquires a captured image, the captured image being captured by a camera section that performs imaging in all directions from a single imaging point in a virtual space.

The image generation section generates, on the basis of the captured image, a display image to be displayed on the display.

MODE(S) FOR CARRYING OUT THE INVENTION

Embodiments according to the present technology will now be described below with reference to the drawings.

First Embodiment

[Configuration of Display Apparatus]

Figure 1:
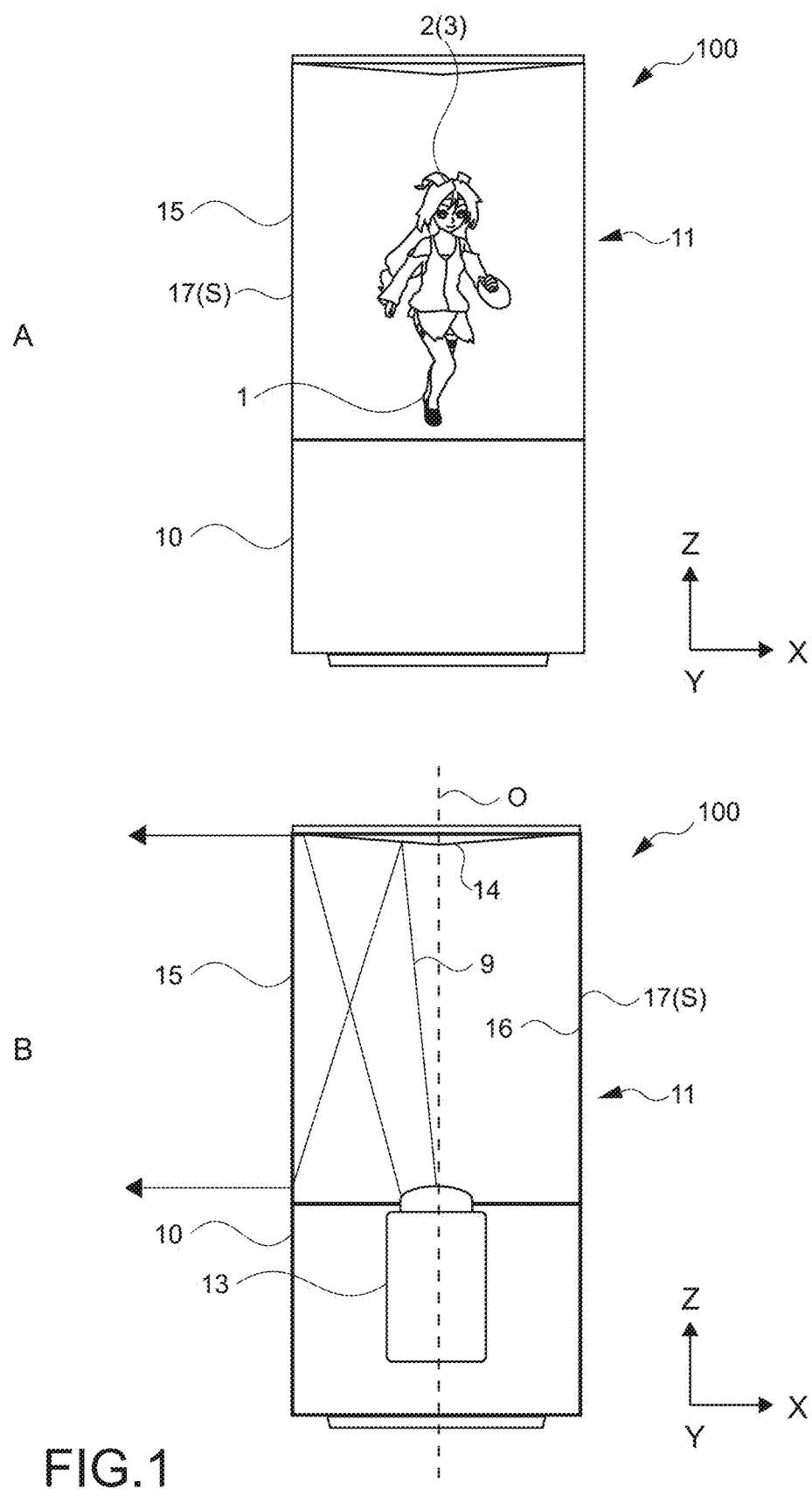
FIG. 1 is a schematic diagram showing a configuration example of a display apparatus according to a first embodiment of the present technology.

FIG. 1 is a schematic diagram showing a configuration example of a display apparatus according to a first embodiment of the present technology.

A display apparatus 100 is an apparatus capable of displaying an image toward all directions of a real space. The display apparatus 100 includes an outward display surface S (outer circumferential surface 17 to be described later) that can be observed from all the directions of the real space.

The display surface S is a screen on which an image is to be displayed (that is, a screen on which an image is presented to an observer), and is stereoscopically configured to surround a predetermined axis, for example. This makes it possible to observe an image from all the directions of 360° around the predetermined axis. Note that the image includes a still image and a moving image (video) in the present disclosure.

The present technology is used to generate such an outward display surface S that can be observed from all the directions, that is, video content to be displayed on a display that displays a video toward the outside.

Hereinafter, an image to be displayed on the display surface S will be referred to as a display image 1. As will be described later, the display image 1 is generated by imaging a virtual object 2 such as a virtual character in a virtual space. FIG. 1 schematically illustrates a character object 3 as an example of the virtual object 2. The display image 1 is video content in which such a character object 3 (virtual object 2) or the like is presented.

In this embodiment, the display apparatus 100 is configured as a cylindrical apparatus as a whole. A central axis O of the cylindrical display apparatus 100 corresponds to the predetermined axis described above. Hereinafter, a direction parallel to the central axis O (a direction in which the display apparatus 100 extends) will be referred to as a Z-axis direction. Further, in a plane intersecting perpendicularly to the Z-axis direction, directions orthogonal to each other will be referred to as an X-axis direction and a Y-axis direction. The display apparatus 100 is typically disposed such that the central axis O (Z-axis direction) is in the perpendicular direction (vertical direction) in the real space.

A of FIG. 1 is a side view showing an outer appearance of the display apparatus 100 as viewed along the Y-axis direction. B of FIG. 1 is a cross-sectional view showing a cross-section of the display apparatus 100, which is cut on the XZ plane so as to include the center O.

As shown in FIG. 1, the display apparatus 100 includes a base portion 10 and a display portion 11.

The base portion 10 is a casing serving as the base of the display apparatus 100. The display apparatus 100 is used in a manner that the base portion 10 is disposed on a desk, a floor, or the like. In the following description, the side where the base portion 10 is provided will be referred to as the lower side of the display apparatus 100, and the opposite side (the side where a reflective mirror 14 to be described later is provided) will be referred to as the upper side of the display apparatus 100.

The base portion 10 has a side surface having a substantially cylindrical shape and a bottom surface connected to the lower side of the side surface, and has a hollow inside. An image projection portion 13 of the display portion 11, a storage portion 20, a controller 21, and the like, which will be described later, are provided in the inner space of the base portion 10. In addition, a communication module, a power supply module, and the like (not shown) may be provided in the base portion 10.

The display portion 11 is a display module capable of multi-directional display, in which images are displayed toward various directions. In this embodiment, a projection-type display module is used as the display portion 11.

The display portion 11 includes the image projection portion 13, a reflective mirror 14, and a screen 15. On those, the screen 15 functions as a display according to this embodiment.

The image projection portion 13 is a projector that projects image light 9. Here, the image light 9 is light that forms an image, and includes a light flux for displaying each pixel included in the image. The image light 9 is projected radially around a predetermined optical axis. As shown in B of FIG. 1, the image projection portion 13 is disposed toward the upper side of the display apparatus 100 in the inner space of the base portion 10 such that the optical axis coincides with the central axis O.

The image projection portion 13 is typically a color projector capable of displaying color images, but a projector or the like that performs single color display may be used.

A specific configuration of the image projection portion 13 is not limited. For example, a laser projector including a laser light source is used. Alternatively, a projector including a light emitting diode (LED) light source or a light source such as a halogen lamp may be used.

The reflective mirror 14 reflects the image light 9 projected from the image projection portion 13 toward the screen 15. The reflective mirror 14 has a reflective surface that reflects the image light 9, and is disposed on the upper side of the display apparatus 100 with the reflective surface facing the image projection portion 13.

The reflective mirror 14 is typically designed such that the image light 9 reflected by the reflective surface has an equal incidence angle with respect to any position of the screen 15. Such a design can be achieved by, for example, appropriately forming the reflective surface by using a paraboloidal surface or free-form surface.

In the example shown in B of FIG. 1, the image light 9 projected radially around the central axis O is reflected, as substantially parallel light (parallel light), in directions separated away from the central axis O in a plane including the central axis O. This makes it possible to match the incidence angles of the image light 9 with respect to the screen 15. Further, the incidence angle with respect to the screen 15 can be controlled by controlling the angle of the parallel light.

In addition, a specific configuration of the reflective mirror 14 is not limited.

The screen 15 diffuses the incident image light 9 to display an image. In other words, the screen 15 functions as a display.

In this embodiment, a cylindrical screen (cylindrical display) around the central axis O is used as the screen 15. The screen 15 is used, for example, by being bonded to the inside or the outside of a cylindrical transparent member (not shown). Alternatively, the screen 15 itself may be configured as a structural member. The base portion 10 is connected to the lower side of the screen 15, and the reflective mirror 14 is connected to the upper side thereof.

Hereinafter, the inner surface of the screen 15, that is, the surface directed toward the central axis O will be referred to as an inner circumferential surface 16. Further, the outer surface of the screen 15, that is, the surface opposite to the inner circumferential surface 16 will be referred to as an outer circumferential surface 17.

As shown in FIG. 1, the screen 15 is a transmissive diffuser screen that emits the image light 9 incident from the inner circumferential surface 16, as diffused light, from the outer circumferential surface 17. Therefore, the diffused light of each pixel constituting the image is emitted from the outer circumferential surface 17.

Further, in this embodiment, the screen 15 is configured to be capable of displaying an image toward all directions of 360° with the central axis O being as an axis. In other words, the screen 15 is a full-circumference screen (full-circumference display) capable of displaying an image along the entire circumference. This makes it possible for an observer to observe the image displayed on the screen 15 from any direction. In this embodiment, the outer circumferential surface 17 corresponds to an outward display surface that can be observed from all directions of the real space.

Note that the screen 15 does not necessarily have to be a full-circumference display and may have a structure (slit or the like) that prevents an image from being displayed in some directions of the outer circumferential surface 17, for example.

Typically, a transparent diffuser screen constituted using a transmissive holographic optical element (HOE) is used as the screen 15. Here, the HOE is an element that diffracts incident light by using interference fringes. By appropriately exposing the interference fringes, it is possible to change the traveling direction of the light or to diffuse the light.

In this embodiment, the screen 15 is constituted to diffuse the light, which is incident on the inner circumferential surface 16 at a predetermined incidence angle, toward a substantially perpendicular direction from the outer circumferential surface 17 by using the transmissive HOE. The reflective mirror 14 is configured to cause the image light 9 to enter the screen 15 at the predetermined incidence angle. Thus, an image is displayed most brightly on the outer circumferential surface 17 of the screen 15 when viewed from the perpendicular direction.

Note that the light incident on the screen 15 (transmissive HOE) at an angle other than the predetermined incidence angle is transmitted through the screen 15 almost without being diffracted by the interference fringes. For that reason, for example, background light that is incident on the screen 15 from a direction perpendicular thereto is transmitted through the screen 15 as it is. The observer can observe an image or the like superimposed on the background on the opposite side with the screen 15 interposed therebetween. Therefore, the screen 15 can be said to be a transparent screen (transparent display) that transmits visible light.

As described above, the display portion 11 is configured to project a video from the image projection portion 13 (projector), which is disposed at the center of the lower portion of the display apparatus 100, onto the screen 15 (transparent diffuser screen) rolled in a cylindrical shape over all directions of 360° by using the reflective mirror 14 provided on the upper surface.

Note that the configuration of the display portion 11 is not limited to the configuration using the projector and the transparent diffuser screen, and other configurations may be used.

For example, a curved display or the like configured using a transparent liquid crystal display (LCD), a transparent organic light emitting diode (OLED), a transparent light emitting diode (LED), or the like may be used as the display portion 11. Further, a transparent micro LED display in which LED devices are miniaturized, or the like may be used.

Further, an opaque display may be used as the display of the display apparatus 100. In such a case, an LCD having no light transmittance, an OLED display or LED display having no light transmittance, or the like is used. In addition, the configuration of the display portion 11 is not limited, and any display of a projection type or a spontaneous-emission type may be used.

[Functional Blocks of Display Apparatus]

Figure 2:
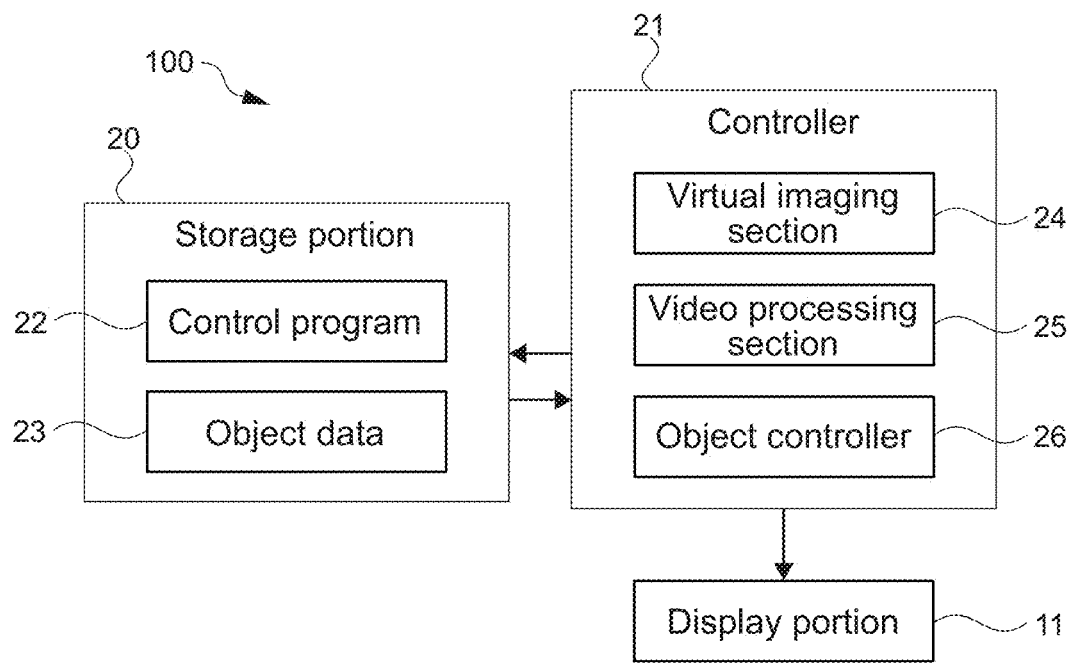
FIG. 2 is a block diagram showing a functional configuration example of the display apparatus.

FIG. 2 is a block diagram showing a functional configuration example of the display apparatus 100. The display apparatus 100 further includes the storage portion 20 and the controller 21 in addition to the display portion 11 described above.

The storage portion 20 is a nonvolatile storage device. As the storage portion 20, for example, a recording medium using a solid-state device such as a solid state drive (SSD) or a magnetic recording medium such as a hard disk drive (HDD) is used. In addition to the above, the type or the like of the recording medium used as the storage portion 20 is not limited. For example, any recording medium that records data in a non-transitory manner may be used.

The storage portion 20 stores a control program 22 for controlling the entire operation of the display apparatus 100. The control program 22 corresponds to a program according to this embodiment. Further, the storage portion 20 functions as a computer-readable recording medium on which the program is recorded.

Further, object data 23 is stored in the storage portion 20. The object data 23 is data relating to the virtual object 2 disposed in the virtual space. For example, bone data representing a skeleton or the like of the character object 3, and model data or graphics data representing a three-dimensional shape or the like are stored as the object data 23.

The controller 21 controls the operations of the respective blocks of the display apparatus 100. The controller 21 has a hardware configuration necessary for a computer, such as a CPU and a memory (RAM, ROM). The CPU loads the control program stored in the storage portion 20 to the RAM and executes the control program, so that various types of processing are executed. The controller 21 functions as an information processing apparatus according to this embodiment.

For example, a programmable logic device (PLD) such as a field programmable gate array (FPGA) or another device such as an application specific integrated circuit (ASIC) may be used as the controller 21. Further, for example, a processor such as a graphics processing unit (GPU) may be used as the controller 21.

In this embodiment, the CPU of the controller 21 executes the program according to this embodiment, so that a virtual imaging section 24, a video processing section 25, and an object controller 26 are implemented as functional blocks. Those functional blocks perform a display method according to this embodiment. Note that dedicated hardware such as an integrated circuit (IC) may be appropriately used in order to implement each functional block.

Further, those functional blocks may be implemented by another computer or the like capable of communicating with the controller 21. For example, the functional blocks may be implemented by a PC, a smart phone, a cloud server on the web, or the like connected to the display apparatus 100.

The virtual imaging section 24 acquires captured images, which are captured by a camera unit that performs imaging in all directions from a single imaging point in the virtual space. The camera unit is a virtual imaging module configured using a virtual camera so as to be capable of performing imaging in all directions of 360° from one point (imaging point) in the virtual space.

In this embodiment, the camera unit is configured using a plurality of virtual cameras in combination. Therefore, the virtual imaging section 24 controls the camera unit to image the virtual space and read an image captured by each virtual camera constituting the camera unit as a captured image.

In this embodiment, the virtual imaging section 24 corresponds to an image acquisition section. Further, the camera unit 35 corresponds to a camera section.

Figure 3:
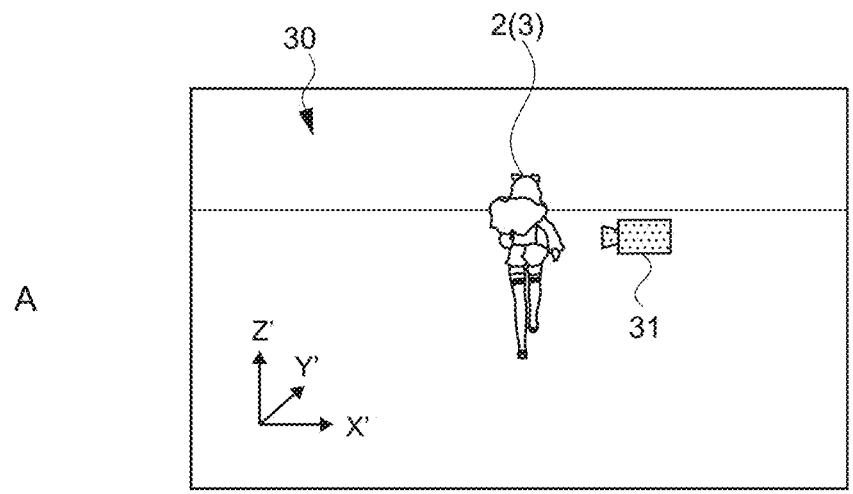
FIG. 3 is a schematic diagram for describing imaging by a virtual camera.
Figure 3:
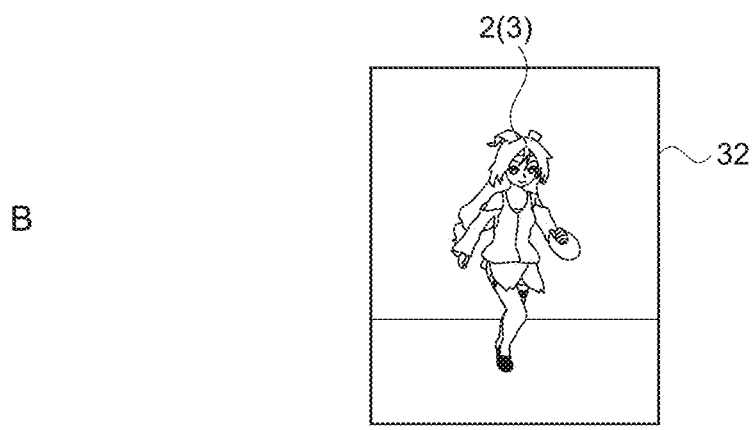

FIG. 3 is a schematic diagram for describing imaging by a virtual camera. First, imaging using a virtual camera 31 in a virtual space 30 will be described with reference to FIG. 3.

A of FIG. 3 is a schematic diagram showing a state in which a character object 3, which is a virtual object 2, is imaged by a single virtual camera 31 in a virtual space 30. B of FIG. 3 is a schematic diagram showing an image captured by the single virtual camera 31 shown in A of FIG. 3. Hereinafter, the image captured by the single virtual camera 31 will be referred to as an individual image 32.

The virtual space 30 is a three-dimensional space virtually constructed. In the following description, directions orthogonal to each other in the virtual space 30 will be referred to as an X'-axis direction, a Y'-axis direction, and a Z'-axis direction. Further, a direction parallel to the X'Y' plane is defined as a horizontal direction in the virtual space 30. Further, the Z'-axis direction orthogonal to the X'Y' plane is a perpendicular direction in the virtual space 30. FIG. 3 illustrates a horizontal line representing the horizontal direction of the virtual space 30. The horizontal line can be switched to be displayed or not to be displayed as necessary.

In the virtual space 30, an action of the character object 3 or the like is controlled on the basis of those horizontal direction and perpendicular direction.

The virtual camera 31 is a virtual camera that images the virtual space 30. A of FIG. 3 schematically illustrates an object representing the virtual camera 31. Unlike an actual camera, the virtual camera 31 is not physically restricted when an imaging position or an imaging direction is set. For that reason, for example, it is possible to provide a configuration in which a plurality of virtual cameras 31 that images different directions is disposed at the same imaging position. Further, imaging parameters such as an angle of view and a magnification of the virtual camera 31 can also be arbitrarily set.

In the virtual space 30 shown in A of FIG. 3, a character object 3 that performs a running action is disposed. Further, a single virtual camera 31 is disposed in the virtual space 30 so as to image the character object 3 from the front. In this case, as shown in B of FIG. 3, an individual image 32 obtained by imaging the character object 3 performing a running action from the front is output from the virtual camera 31.

As described above, use of the virtual camera 31 makes it possible to image the character object 3 or the like that performs an action in the virtual space 30 from any angle.

Figure 4:
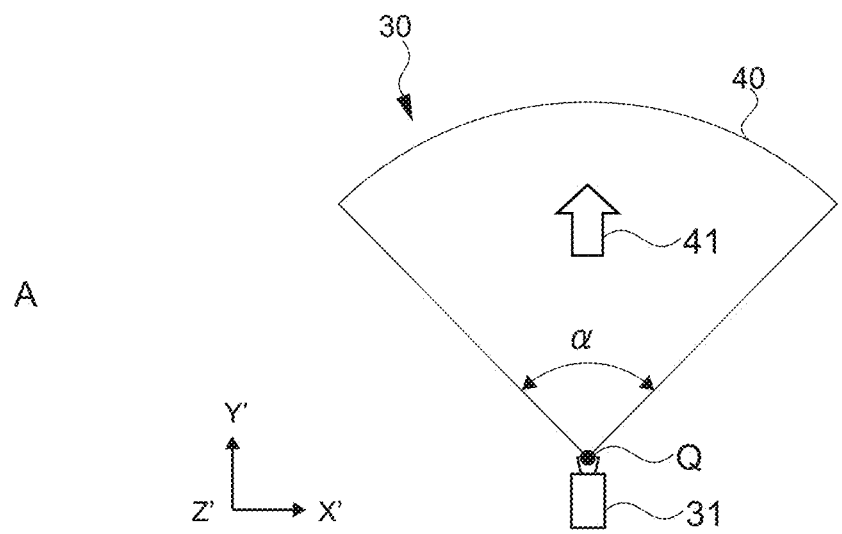
FIG. 4 is a schematic diagram showing a configuration example of a camera unit.
Figure 4:
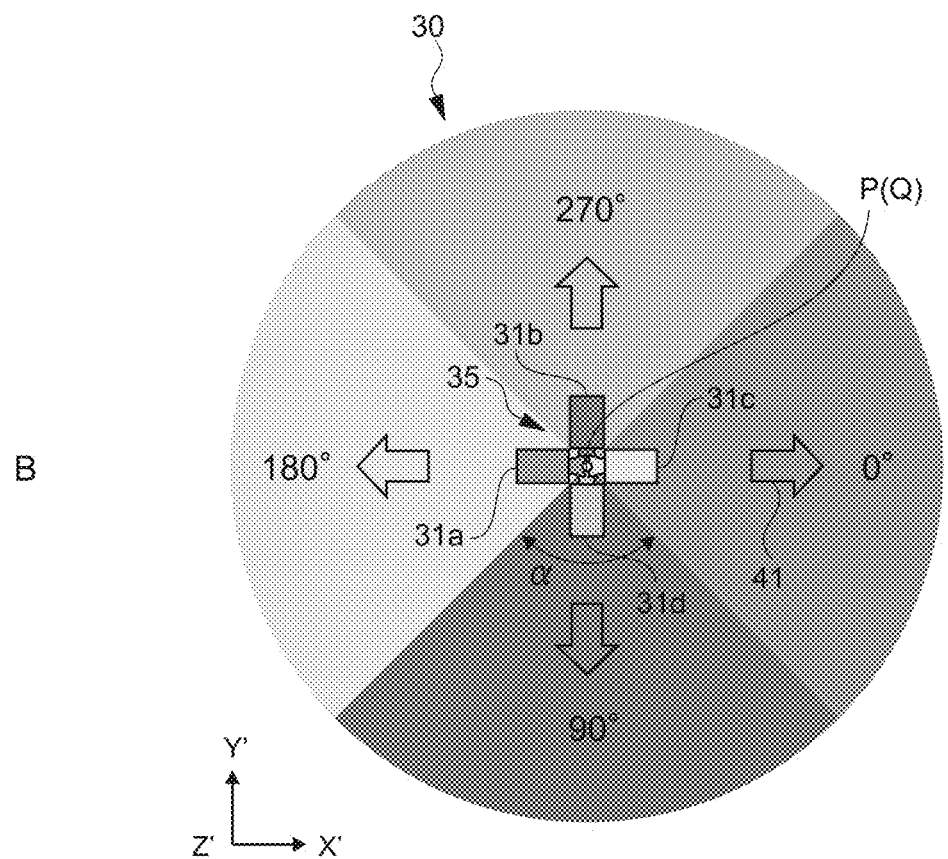

FIG. 4 is a schematic diagram showing a configuration example of the camera unit. In this embodiment, a plurality of virtual cameras 31 is used in combination to constitute the camera unit 35 that performs imaging in all directions from a single imaging point P in a virtual space.

A of FIG. 4 is a schematic diagram showing an angle-of-view range 40 of a single virtual camera 31 constituting the camera unit 35. A of FIG. 4 schematically illustrates the virtual camera 31 disposed with an imaging direction 41 being directed in the horizontal direction of the virtual space 30, and the angle-of-view range 40 of the virtual camera 31.

The imaging direction 41 is, for example, a direction of the optical axis of the virtual camera 31, and is a direction in which the angle-of-view range 40 is directed. Therefore, it can be said that the imaging direction 41 is a line-of-sight direction of the virtual camera 31. The angle-of-view range 40 is an imaging range in the virtual space 30 in which an image is captured by the virtual camera 31. The virtual camera 31 images an object included in the angle-of-view range 40.

Further, the angle-of-view range 40 can be represented as an angle range extending from an angle-of-view center Q around the optical axis (imaging direction 41) of the virtual camera 31. Here, the angle-of-view center Q is a starting point of the angle-of-view range 40 (imaging range). For example, the virtual point at which the end lines of the angle of view of the virtual camera 31 intersect becomes the angle-of-view center Q.

Here, the angle-of-view range 40 is schematically illustrated by a fan-shaped region having the angle-of-view center Q as a vertex. Note that the depth of the angle-of-view range 40 (distance from the angle-of-view center Q) is not fixed.

In A of FIG. 4, the angle of the fan shape having the angle-of-view center Q as a vertex corresponds to a horizontal angle of view $\alpha$. The horizontal angle of view $\alpha$ is an angle representing the angle-of-view range 40 of the virtual camera 31 in the horizontal direction. Note that the angle representing the angle-of-view range 40 of the virtual camera 31 in the perpendicular direction will be referred to as a perpendicular angle of view $\beta$. The horizontal angle of view $\alpha$ and the perpendicular angle of view $\beta$ define, for example, the horizontal width and the vertical width of the individual image 32, respectively.

In the virtual camera 31 shown in A of FIG. 4, for example, a range of ±45° with the optical axis (imaging direction 41) as the center is set as the angle-of-view range 40 in the horizontal direction. In other words, the horizontal angle of view $\alpha$ is set to 90°.

Further, the perpendicular angle of view $\beta$ is not limited, and is set to any angle of 180° or less, for example.

B of FIG. 4 is a schematic diagram showing a configuration example of a camera unit 35 including four virtual cameras 31a to 31d. An angle-of-view range 40 (horizontal angle of view $\alpha$ and perpendicular angle of view) similar to that of the virtual camera 31 shown in A of FIG. 4 is set for each of the virtual cameras 31a to 31d.

The virtual cameras 31a to 31d constituting the camera unit 35 are disposed toward different directions such that each angle-of-view center Q coincides with the imaging point P. Note that the imaging point P can be set to any position within the virtual space 30 (for example, the coordinate origin or the like of the virtual space 30).

As described above, the camera unit 35 includes the plurality of virtual cameras 31 disposed such that each angle-of-view center Q coincides with the imaging point P and is directed in a different direction.

This makes it possible to easily perform imaging in all directions of the virtual space 30 viewed from the imaging point P.

In the following description, it is assumed that the direction from the imaging point P toward the right side in the drawing is 0°, which increases in a clockwise direction. As shown in b of FIG. 4, the virtual cameras 31a, 31b, 31c, and 31d are disposed such that the directions of their imaging directions 41 are respectively 0° (rightward direction), 90° (downward direction), 180° (leftward direction), and 270° (upward direction). In other words, the virtual cameras 31a to 31d are disposed such that the respective angle-of-view ranges 40 do not overlap with each other.

Note that, in b of FIG. 4, the same horizontal angle of view $\alpha$ is set for all the virtual cameras 31. The present technology is not limited to the above. For example, the horizontal angles of view $\alpha$ of the virtual cameras 31 constituting the camera unit 35 may be individually set such that the angles of view do not overlap with each other.

As described above, in this embodiment, the angle-of-view ranges 40 of the plurality of virtual cameras 31 constituting the camera unit 35 are set so as not to overlap with each other. This makes it possible to perform imaging in all directions of the virtual space 30 without overlap.

Imaging by the plurality of virtual cameras 31 is typically performed at the same timing. Therefore, the plurality of individual images 32 output by the camera unit 35 in one time of imaging is a series of images obtained by performing imaging in all directions along the horizontal direction of the virtual space 30 by dividing the angle of view at a certain timing.

The plurality of individual images 32 captured by the respective virtual cameras 31 is output to the virtual imaging section 24 as captured images captured by the camera unit 35. In other words, the virtual imaging section 24 acquires the plurality of individual image 32 captured by the plurality of virtual cameras 31 as captured images.

Referring back to FIG. 2, the video processing section 25 generates a display image 1 on the basis of the captured images acquired by the virtual imaging section 24. As described with reference to FIG. 1, the display image 1 is an image to be displayed on the screen 15 having the outward display surface S (outer circumferential surface 17) that can be observed from all directions of the real space.

Specifically, various kinds of image processing such as processing of correcting distortion and processing of combining the images are executed for the plurality of individual images 32, which are captured images of the camera unit 35, and image data of the display image 1 is generated.

For example, the cylindrical screen 15 provided to the display apparatus 100 is seamless in the circumferential direction (left-right direction). This allows the display apparatus 100 to continuously present a character or the like moving along the circumferential direction of the screen 15.

The display image 1 is a content video created on the assumption that the content video is displayed on the display surface S that can be observed from all directions, and is configured such that the movement or the like of the character can be properly displayed on the display surface S. The processing of generating the display image 1 will be described in detail later.

In this embodiment, the video processing section 25 corresponds to an image generation section.

The object controller 26 controls at least one virtual object 2 disposed in the virtual space 30. In the virtual space 30, a single virtual object 2 or a plurality of virtual objects 2 is disposed. The object controller 26 controls the arrangement, posture, action, and the like of the virtual object 2.

Further, at least one virtual object 2 includes at least one of the character object 3 described above or a background object. The character object 3 is an object representing a virtual character or the like. The background object is, for example, an object for representing the background of the character object 3, and a three-dimensional model representing the background, a graphical image, a landscape photograph, or the like is used.

For example, when the character object 3 is disposed as the virtual object 2, the posture or action of the character object 3 is controlled on the basis of the bone data or graphic data thereof. Alternatively, the expression or the like of the character object 3 may be controlled.

Further, for example, the display of the background object is controlled in accordance with the action of the character object 3, the progress of the content, or the like.

The details of the control of the virtual object 2 may be set in advance or may be changed in accordance with an operation input or the like by an observer.

A method of controlling the virtual object 2 will be described later in detail.

[Captured Image and Display Image]

Figure 5:
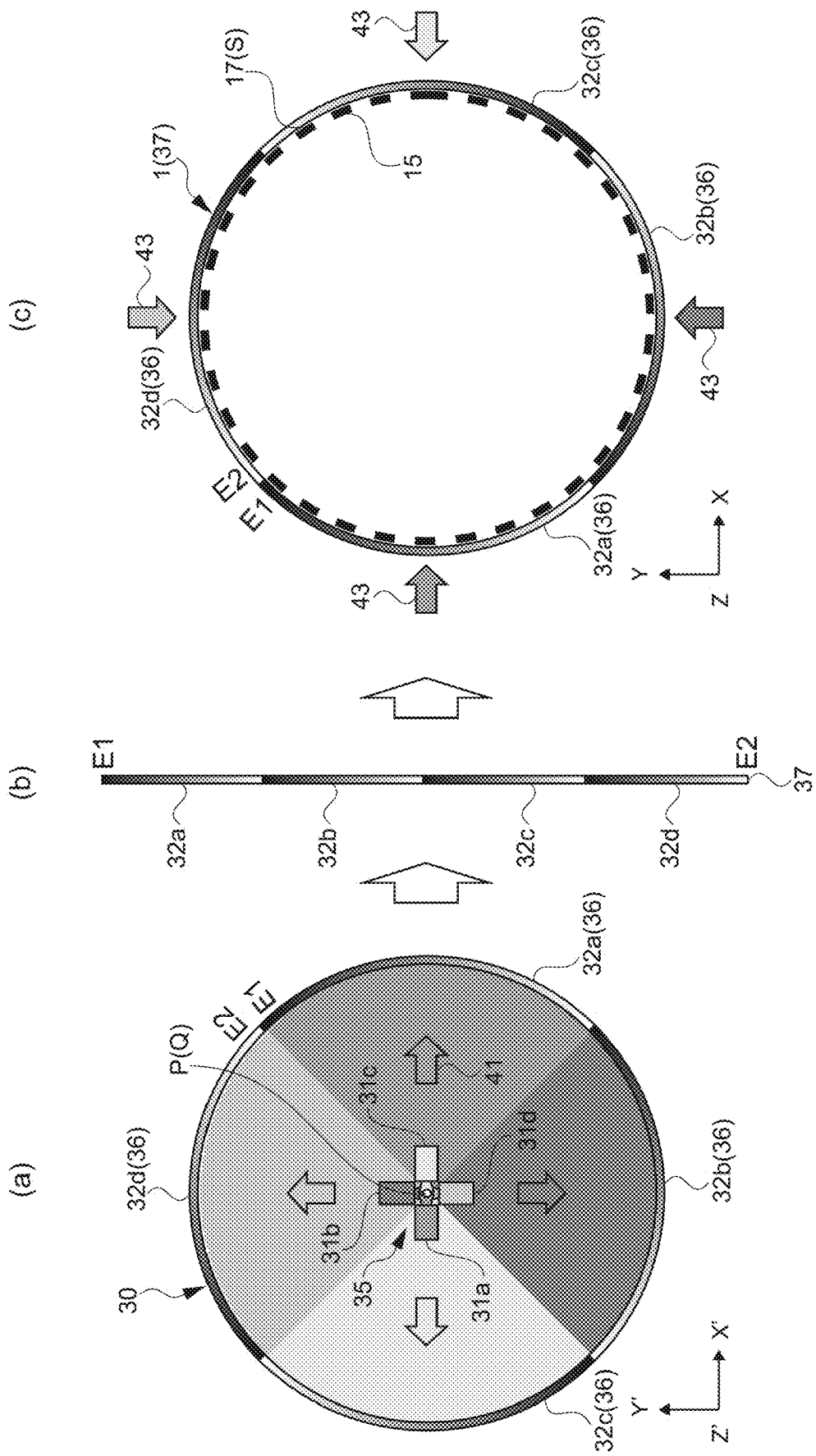
FIG. 5 is a schematic diagram showing a relationship between a captured image and a display image.

FIG. 5 is a schematic diagram showing a relationship between a captured image and a display image.

(a) of FIG. 5 schematically illustrates a captured image 36 captured by the camera unit 35 in the virtual space 30. The camera unit 35 is the camera unit 35 shown in B of FIG. 4, and the four virtual cameras 31*a* to 31*d* are installed such that the angle-of-view centers Q overlap with each other.

The captured image 36 includes individual images 32*a* to 32*d* captured by the respective virtual cameras 31*a* to 31*d*. (a) of FIG. 5 schematically illustrates the individual images 32*a* to 32*d* by using thin arcuate regions.

Further, a direction within the individual image 32 (a direction in angle of view) is represented by gradation. Here, since the horizontal angle of view α is 90°, the direction in angle of view is expressed in an angle range of ±45° with the imaging direction 41 as 0°. Here, in the individual image 32, the end portion where the direction in angle of view is −45° is represented by the darkest color, and the end portion where the direction in angle of view is ±45° is represented by the brightest color.

In the following description, an end portion of an individual image 32*a* having an direction in angle of view of −45° will be referred to as E1. Further, in an individual image 32*d*, an end portion having an direction in angle of view of ±45° will be referred to as E2. Those end portions E1 and E2 are portions in which the individual images 32*a* and 32*d* come into contact with each other, and correspond to the same direction.

In this embodiment, the video processing section 25 generates an omnidirectional image 37 obtained by performing imaging in all directions of the virtual space from the imaging point P on the basis of the captured image 36. The omnidirectional image 37 is an image obtained by performing imaging in each direction viewed from the imaging point P, that is, performing imaging in all directions from the imaging point P toward the outside. In other words, the omnidirectional image 37 is a video outwardly viewed from the imaging point P over the entire circumference.

In the video processing section 25, the output of the camera unit 35 is appropriately processed to generate such an omnidirectional image 37.

Specifically, the video processing section 25 combines the plurality of individual images 32 to generate an omnidirectional image 37 obtained by performing imaging in all the directions of the virtual space 30 from the imaging point P. In other words, the videos (individual images 32) captured by the respective virtual cameras 31 are combined to generate a single video (omnidirectional image 37).

For example, pre-processing for correcting a distortion or the like of each individual image 32 is executed. The individual images 32 obtained after the pre-processing are then combined such that the directions in the images are continuously changed.

(b) of FIG. 5 schematically illustrates the omnidirectional image 37 in which the individual images 32*a* to 32*d* are combined. Here, the individual images 32*a* to 32*d* are combined with one another in this order. More specifically, an end portion of the individual image 32*a* where the direction in angle of view is ±45° is connected to an end portion of the individual image 32*b* where the direction in angle of view is −45°. Further, an end portion of the individual image 32*b* where the direction in angle of view is ±45° is connected to an end portion of the individual image 32*c* where the direction in angle of view is −45°. Further, an end portion of the individual image 32*c* where the direction in angle of view is ±45° is connected to an end portion of the individual image 32*d* where the direction in angle of view is −45°. In this case, one end portion of the omnidirectional image 37 is E1 and the other end portion thereof is E2.

In this embodiment, the omnidirectional image 37 is used as the display image 1. In other words, the omnidirectional image 37 is displayed as it is on the outer circumferential surface 17 (outward display surface S) of the cylindrical screen 15.

(c) of FIG. 5 is a schematic diagram of the screen 15 (thick dotted line) disposed in the real space as viewed from above along the Z-axis direction. (c) of FIG. 5 schematically illustrates the display image 1 (omnidirectional image 37) displayed on the outer circumferential surface 17 of the screen 15, and observation directions 43 in which the individual images 32*a* to 32*d* constituting the display image 1 are observed.

Here, the individual images 32*a* to 32*d* are displayed on the outer circumferential surface 17 of the screen 15 so as to be capable of being observed from the left side, the lower side, the right side, and the upper side in the drawing, respectively.

As described above, the omnidirectional image 37 is a video outwardly viewed from the imaging point P in the virtual space 30. Such an omnidirectional image 37 is displayed as a video (display image 1) inwardly viewed on the cylindrical screen 15.

This is equivalent to rerolling a sheet, which has been rolled into a cylindrical shape such that an image can be viewed from the inside, so as to be capable of viewing the image from the outside, for example.

Therefore, in the omnidirectional image 37, the crosswise relationship or the vertical relationship of the subject is not reversed. For example, the relationship between the upper, lower, left, and right sides in the individual image 32*a* is maintained in the case of viewing from the imaging direction 41 of the virtual camera 31*a* in (a) of FIG. 5 and in the case where the screen 15 is observed from the left side in (c) of FIG. 5. Similarly, the relationship between the upper, lower, left, and right sides does not change for the other individual images 32*b* to 32*d*.

This makes it possible to easily generate a content video without worrying about a state in which the positional relationship is reversed, for example.

As described above, in this embodiment, the camera unit 35 is constituted by arranging the plurality of virtual cameras 31 in which the angle-of-view centers Q overlap with the imaging point P in the virtual space 30. The videos (individual images 32) of the respective virtual cameras 31, which are obtained from the camera unit 35, are then connected to each other to generate a video (omnidirectional image 37) obtained by performing imaging in all directions of 360° from the imaging point P (inside). Such an omnidirectional image 37 is used as the display image 1 of the screen 15 (cylindrical display for outward display).

Figure 6:
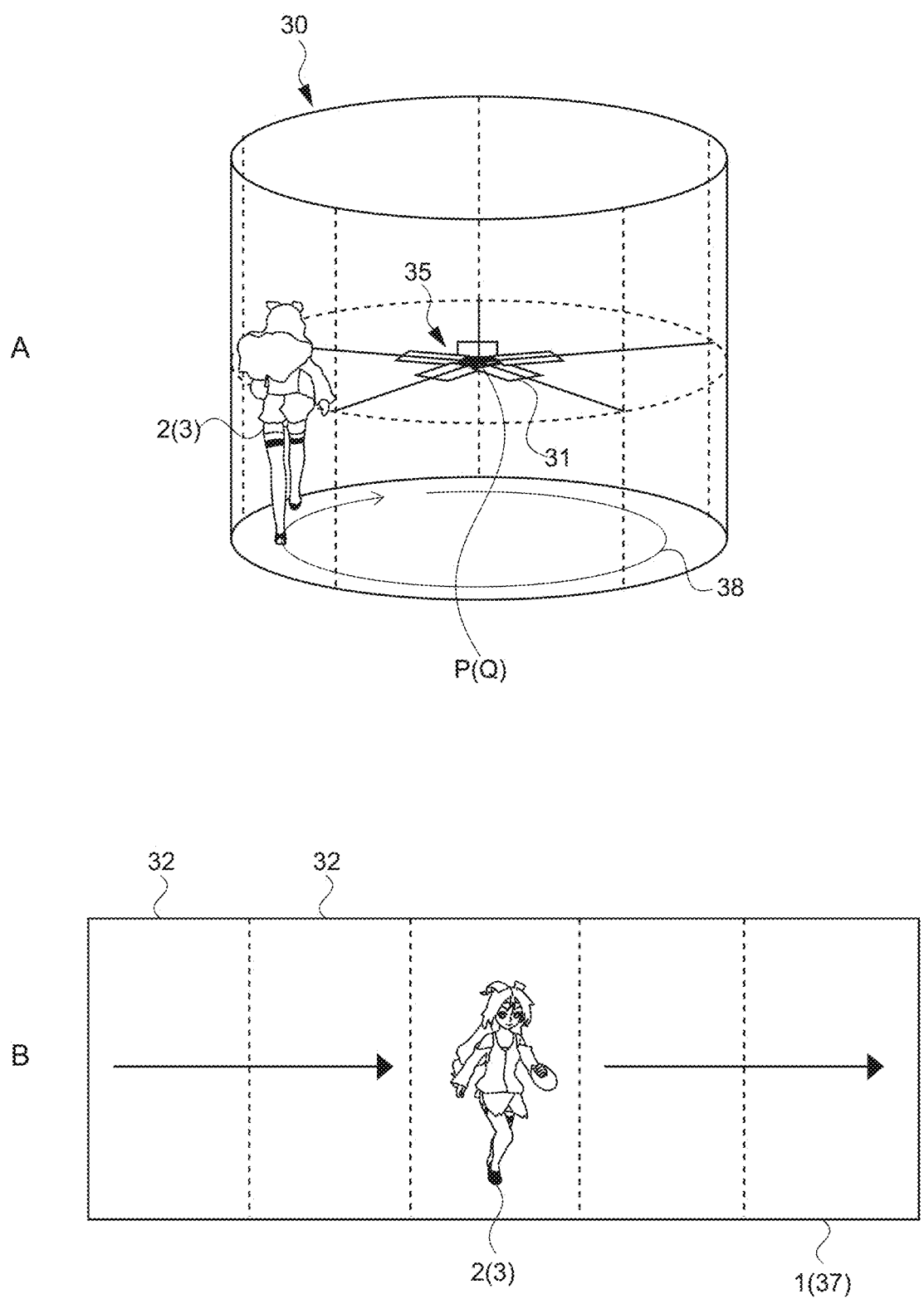
FIG. 6 is a schematic diagram for describing imaging by the camera unit.

FIG. 6 is a schematic diagram for describing the imaging by the camera unit 35. A of FIG. 6 is a schematic diagram showing a state of imaging in the virtual space 30 by the camera unit 35. B of FIG. 6 is a schematic diagram showing the display image 1 (omnidirectional image 37) generated by the imaging shown in A of FIG. 6.

Here, it is assumed that a state in which the character object 3 is running is imaged using the camera unit 35 including five virtual cameras 31. In this case, the horizontal angle of view α of each virtual camera 31 is 72°.

In this embodiment, the object controller 26 moves the virtual object 2 (character object 3) along a trajectory 38 set on the basis of the imaging point P. This makes it possible to control the movement of the virtual object 2 with the imaging point P as a reference. As a result, for example, it is possible to accurately control the depth position or the like of the virtual object 2 when the virtual object 2 is displayed on the display apparatus 100.

Note that the position of the virtual object 2 may deviate from the trajectory 38 depending on the action of the virtual object 2, but the basic moving position is set on the trajectory 38. Therefore, it can be said that the trajectory 38 is a reference axis serving as a reference for the behavior of the virtual object 2.

Here, as shown in A of FIG. 6, the character object 3 is operated so as to run along a circular trajectory around a perpendicular axis passing through the imaging point P. Further, the direction (posture) of the character object 3 is controlled, for example, such that a surface (a front surface, a side surface, or the like) of the character object 3 desired to be shown is directed toward the imaging point P.

Further, a background object may be disposed as a background of the character object 3. The background object is disposed, for example, on the rear side of the character object 3 as viewed from the imaging point P. Therefore, the radius of the trajectory 38 for moving the background object is larger than that of the trajectory 38 of the character object 3. The background object is appropriately moved so as to be positioned in the background in accordance with the movement of the character object 3.

As described above, the camera unit 35 performs imaging in a state in which the character object 3 and the background object are moving along the trajectory 38.

In this case, the character object 3 located at a certain distance from the imaging point P is simultaneously imaged by the virtual cameras 31 synchronized with each other. Therefore, as shown in B of FIG. 6, the display image 1 (omnidirectional image 37) generated by combining the individual images 32 of the respective virtual cameras 31 is an image obtained by imaging a predetermined surface of the character object 3 that performs a running action.

Note that, in a case where imaging is not simultaneously executed by the virtual cameras 31, imaging may be sequentially performed at as short intervals as possible.

The position of the character object 3 in the azimuth direction (the position in the left-right direction) in the display image 1 sequentially changes in accordance with the movement along the trajectory 38. For example, in B of FIG. 6, the character object 3 appears at the center of the display image 1 developed into the plane. From this state, the character object 3 moves to the right direction in the drawing. When the character object 3 reaches the right end of the display image 1, the character object 3 moves to the left end on the opposite side and the movement in the right direction is continued.

Further, a background object serving as a background of the character object 3 may be disposed and imaged together with the character object 3. In this case, the background object is fixedly disposed at a predetermined position. Further, for example, in a case where content having a front surface is displayed, the background object may be moved in conjunction with the movement of the character object 3.

This makes it possible to display the character object 3 running along the outer circumference of the cylindrical screen 15.

As described above, the camera unit 35 including the plurality of virtual cameras 31 is disposed at the center, the virtual object 2 is moved on the circumference thereof, and imaging is performed. This makes it possible to easily generate the video content or the like of the virtual object 2 moving along the outward display surface S.

Further, the virtual cameras 31 are directed in different directions with their angle-of-view centers Q coinciding with each other. Thus, for example, when one virtual camera 31 is imaging the virtual object 2, another virtual camera 31 that is not adjacent to that camera does not image the virtual object 2. In other words, the captured image 36 (individual images 32) output from the camera unit 35 includes only an image of the character object 3, which is captured from one direction with the imaging point P as a reference.

This avoids a situation in which the virtual object 2 is imaged doubly from different directions. As a result, a proper video for display on the cylindrical screen 15 can be imaged.

Further, the angle of view of each virtual camera 31 is set so as not to overlap with each other and so as not to form a gap (see FIG. 4 and the like). Therefore, it is possible to prevent double imaging and to image all directions without blind spots. Note that if the angles of view overlap, the overlapping portions can be trimmed and then used.

As a result, the blind spot of the virtual camera 31 disappears, and the virtual object 2 can be properly imaged regardless of the direction of the virtual object 2, for example.

Figure 8:
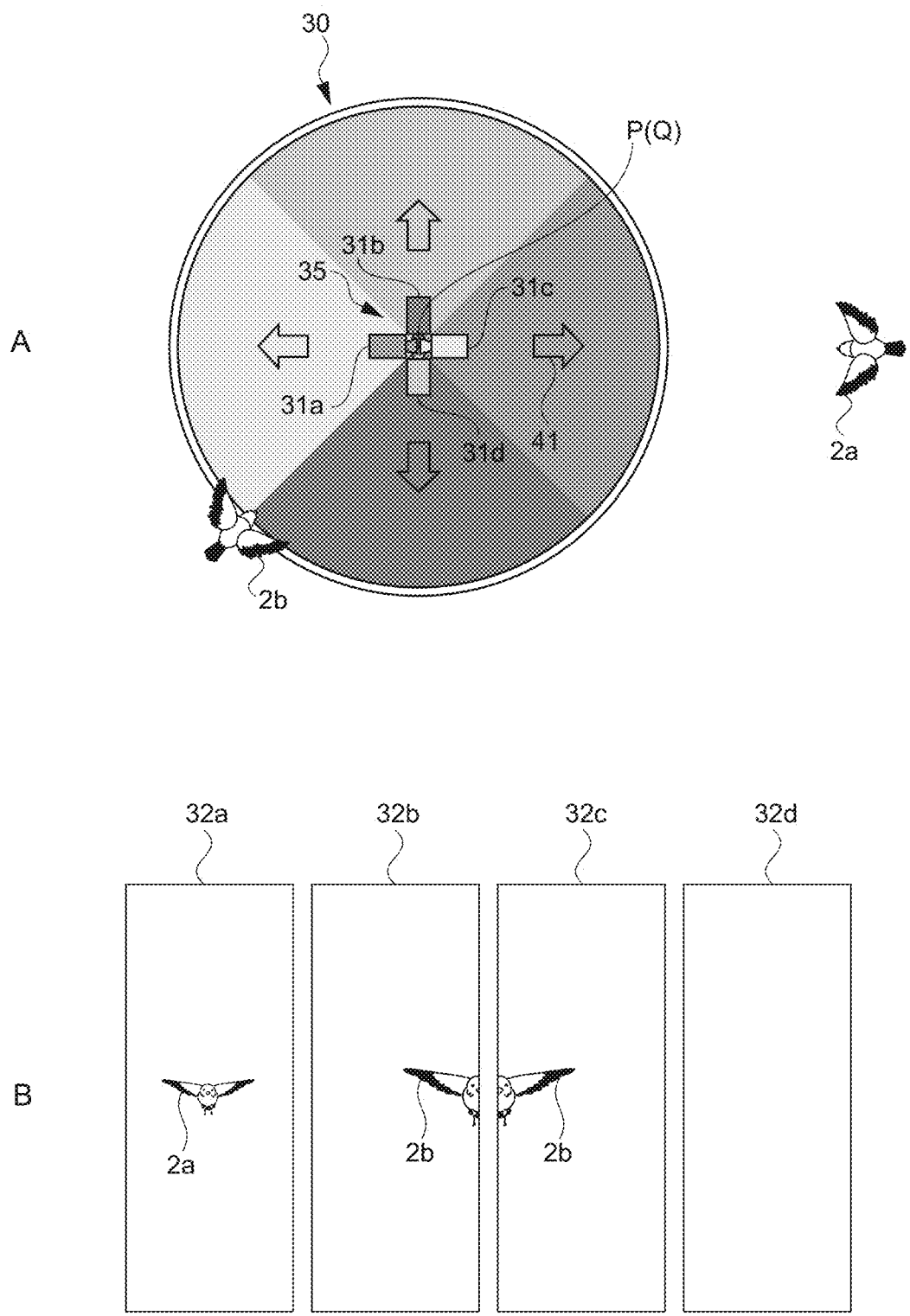
FIG. 8 is a schematic diagram showing an example of capture processing.

Further, use of the camera unit 35 also makes it possible to dispose the virtual object 2 at different depths (see FIG. 8 and the like). Specifically, the depth is represented by the distance between the position of the virtual object 2 and the imaging point P in the virtual space 30.

In this case, in the display image 1, the virtual object 2 at a position close to the imaging point P becomes large, and the virtual object 2 at a position distant from the imaging point P becomes large. Further, an overlap (occlusion) between objects due to a difference in depth can also be expressed. This makes it possible to easily generate video content expressing a difference in depth or a stereoscopic effect on the cylindrical screen 15.

[Display Image Generation Processing]

Figure 7:
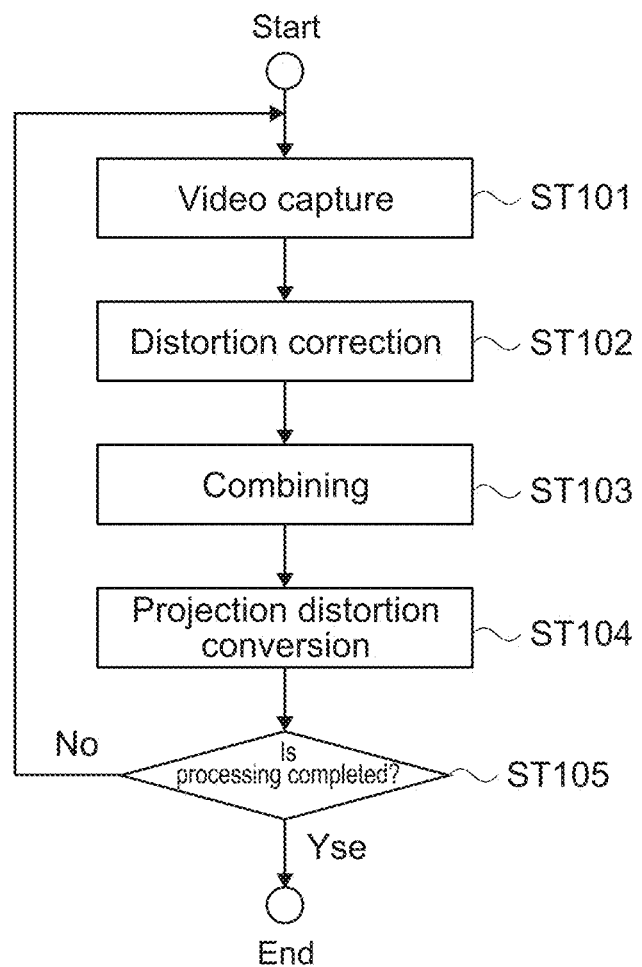
FIG. 7 is a flowchart showing an example of processing of generating the display image.

FIG. 7 is a flowchart showing an example of processing of generating the display image 1.

The processing shown in FIG. 7 is loop processing executed for each frame when the video content (display image 1) of the display apparatus 100 is generated. The processing of generating the display image 1 is executed in real time, for example, when the display image 1 is actually displayed. Alternatively, only the processing of generating the display image 1 may be executed in advance. In this case, the display image 1 is stored in the storage portion 20 or the like as video data.

First, capture processing of capturing a video (captured image 36) of the virtual space 30 using the camera unit 35 is executed (Step 101). In the capture processing, the virtual imaging section 24 synchronizes the plurality of virtual cameras 31 to image a video of the virtual space 30, and each individual image 32 is taken in as the captured image 36.

Next, distortion correction processing of correcting a distortion of the individual image 32 is executed (Step 102).

In the distortion correction processing, the video processing section 25 corrects an imaging distortion for each of the plurality of individual images 32. More specifically, an imaging distortion such as a volume distortion or a lens aberration distortion is corrected such that the imaging angles of view have equal intervals at the horizontal positions of the video (see FIGS. 9 and 10).

Next, combining processing of combining the individual images 32 is executed (Step 103). In the combining processing, the video processing section 25 combines the plurality of individual images 32 whose imaging distortions are corrected. More specifically, the plurality of individual images 32 is combined in the order in which the directions in the images change continuously. By such combining processing, the omnidirectional image 37 (display image 1) described above is generated.

Next, projection distortion conversion processing for projecting the omnidirectional image 37 onto the cylindrical screen 15 is executed (Step 104). As shown in FIG. 1, in the display apparatus 100, a video is projected from a lens (such as a wide conversion lens) of the image projection portion 13 located at the center of the apparatus toward the reflective mirror 14 located on the top surface, and the light is bent toward the direction of the observer by the cylindrical screen 15 to be displayed. As described above, when an image is projected onto the cylindrical screen 15 (cylindrical display) by one projector (image projection portion 13), it is necessary to generate a projection distortion corresponding to the optical system.

In the projection distortion conversion processing, the video processing section 25 performs projection distortion conversion in which a projection distortion is applied to the omnidirectional image 37. The omnidirectional image 37 to which a projection distortion is applied is output to the image projection portion 13, which is a video source of the display apparatus 100.

Note that when a spontaneous-emission type cylindrical display or the like is used as a video source, the projection distortion conversion processing is not executed.

When the projection distortion conversion processing is executed, it is determined whether or not the processing of generating the display image 1 has been completed (Step 105). For example, when the operation of the display apparatus 100 is stopped or when the last frame of the video content is processed, the processing of generating the display image 1 is completed (Yes in Step 105). Further, when it is determined that the processing of generating the display image 1 has not been completed (No in Step 105), the processing of Step 101 and subsequent steps is executed again for the next frame.

Note that the loop processing is executed for each frame in FIG. 7, but a video having a constant length may be imaged first using the camera unit 35, for example. In this case, the distortion correction processing, the combining processing, and the projection distortion conversion processing are sequentially performed on the video imaged first, and then the display image 1 (video content) is generated.

FIG. 8 is a schematic diagram showing an example of the capture processing. A of FIG. 8 is a schematic diagram showing a state of imaging in the virtual space 30 by the camera unit 35. Here, two bird-shaped virtual objects 2a and 2b are disposed in the virtual space 30. It is assumed that the virtual objects 2a and 2b are identical models having an equal size.

The virtual object 2a is disposed at an azimuth angle of 0° when viewed from the imaging point P. This is a position that is the front of the virtual camera 31a (the right side in the drawing as viewed from the imaging point P). The virtual object 2b is disposed at an azimuth angle of 135° when viewed from the imaging point P. This is a direction in which the angles of view of the virtual camera 31b and the virtual camera 31c are in contact with each other.

Note that the virtual object 2a is disposed at a position farther from the imaging point P than the virtual object 2b.

B of FIG. 8 is a schematic diagram showing four individual images 32a to 32d generated by imaging shown in A of FIG. 8. The individual images 32a to 32d are images with a horizontal angle of view α of 90°, which are captured in synchronization by the four virtual cameras 31a to 31d in the virtual space 30, respectively.

For example, the position at which the virtual object 2a appears is the center of the individual image 32a. Further, the position at which the virtual object 2b appears is a boundary position between the individual image 32b and the individual image 32c. In this case, the virtual object 2b appears from the right end of the individual image 32b to the left end of the individual image 32c as shown in B of FIG. 8.

Further, the virtual object 2a is smaller than the virtual object 2b because the virtual object 2a is farther from the imaging point P than the virtual object 2b. In such a way, the virtual objects 2 can be disposed at any position, but one located far from the imaging point P, which is the center of the camera, is displayed to be small. This allows the difference in depth between the virtual objects 2a and 2b to be expressed.

Figure 9:
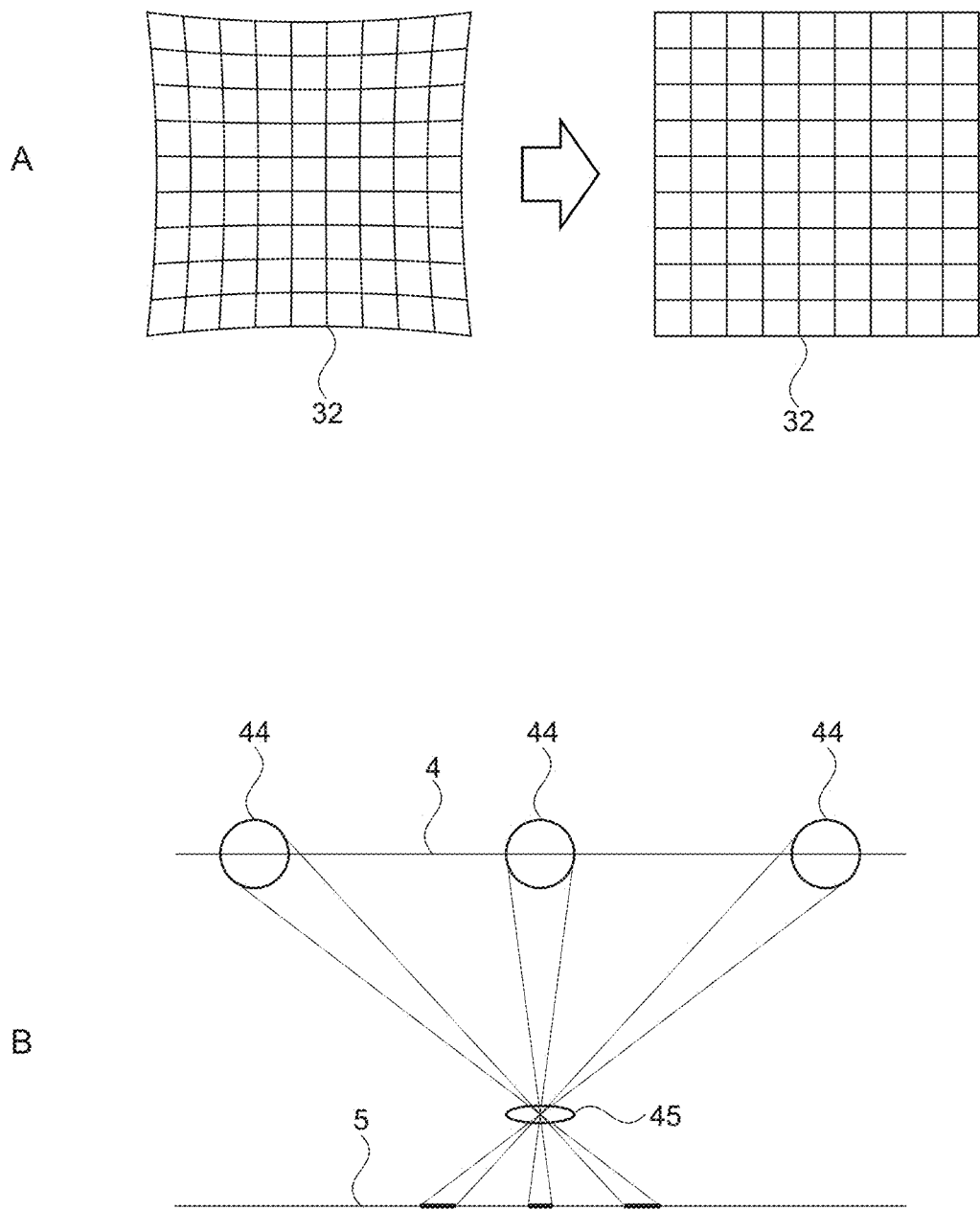
FIG. 9 is a schematic diagram for describing an imaging distortion that occurs in the virtual camera.

FIG. 9 is a schematic diagram for describing an imaging distortion that occurs in the virtual camera 31.

A of FIG. 9 schematically illustrates an example of the distortion correction processing of correcting a lens aberration distortion. The lens aberration distortion (distortion) is a distortion associated with aberration inherent in a lens. When there is a lens aberration distortion, for example, an image formed on the plane and the subject do not have a similar shape.

On the right side of FIG. 9, an example of an individual image 32 obtained by imaging a square lattice is illustrated. Here, a bobbin-shaped lens aberration distortion occurs, and the entire image is distorted. In the distortion correction processing, as shown in the right side of FIG. 9, the distortion of the entire image is corrected such that a square lattice is correctly displayed in the entire image. Note that a barrel-shaped lens aberration distortion or the like may also be corrected.

B of FIG. 9 schematically illustrates an example of a volume distortion. The volume distortion is, for example, a distortion that occurs with respect to stereoscopic objects that appear at the left and right ends of an image.

For example, it is assumed that round bars 44 having the same diameter are arranged in parallel along a plane, and the round bars 44 are imaged from a direction orthogonal to the plane. Here, a direction in which the round bars 44 extend will be referred to as a longitudinal direction, and a direction in which the round bars 44 are arranged will be referred to as a lateral direction. B of FIG. 9 schematically illustrates a surface on which the round bars 44 are arranged (image plane 4) and a surface on which the round bars 44 are imaged via a lens 45 (imaging plane 5).

For example, as shown in B of FIG. 9, an image of the central round bar 44 in front of the lens 45 varies in size in accordance with the magnification of the lens 45. On the other hand, the round bars 44 at positions shifted from the center of the lens 45 to the left and right have a larger size (diameter) on the imaging plane 5 than the round bar 44 located at the center.

This is a distortion that occurs because the round bars 44, which are stereoscopic objects, are imaged on the imaging plane 5 via the lens 45, and the diameter of the round bar 44 becomes larger at the positions closer to the left and right ends of the image. Therefore, such a volume distortion becomes more pronounced as the lens becomes wider.

In the distortion correction processing, such a volume distortion is corrected for each individual image 32.

Figure 10:
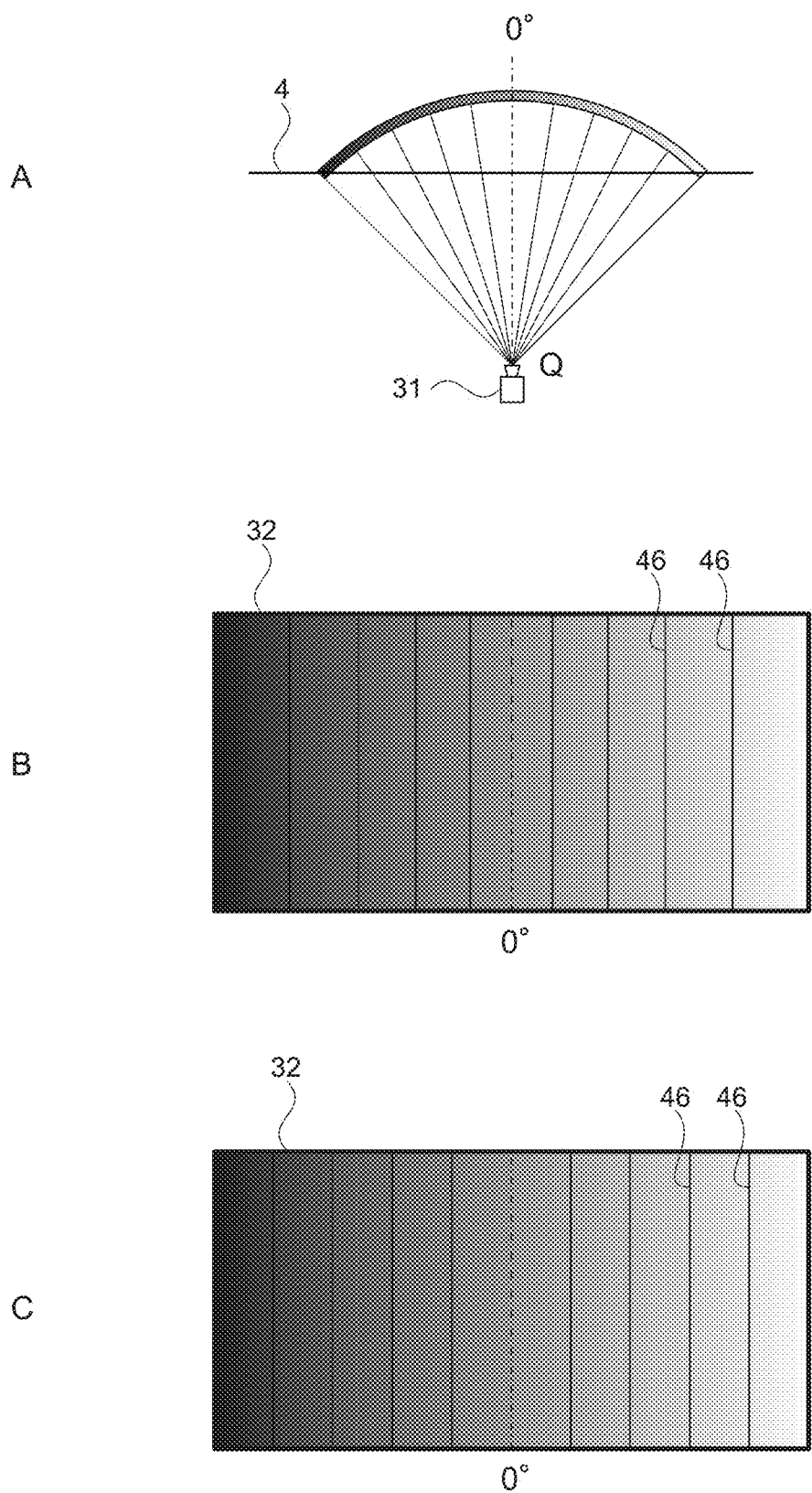
FIG. 10 is a schematic diagram for describing direction correction by distortion correction processing.

FIG. 10 is a schematic diagram for describing the direction correction by the distortion correction processing.

A of FIG. 10 illustrates the relationship between the image plane 4 of the virtual camera 31 and the direction (direction in angle of view) as viewed from the angle-of-view center Q. Here, the image plane 4 is, for example, a plane coming into focus in the imaging by the virtual camera 31.

The image plane 4 can be regarded as a plane orthogonal to the optical axis of the virtual camera 31. Thus, in the image plane 4, the angular pitch of the direction in angle of view as viewed from the angle-of-view center Q changes depending on the position in the horizontal direction (the position in the lateral direction of the image).

B of FIG. 10 illustrates vertical lines 46 representing the angular pitches of the direction in the individual image 32 captured by the virtual camera 31. As compared with the center of the individual image 32, the distance between the vertical lines 46 increases toward the left end and the right end. Thus, as the horizontal position of the individual image 32 is farther from the center of the image, a region on the image, which corresponds to the same angular pitch, is expressed with a larger width.

Figure 14:
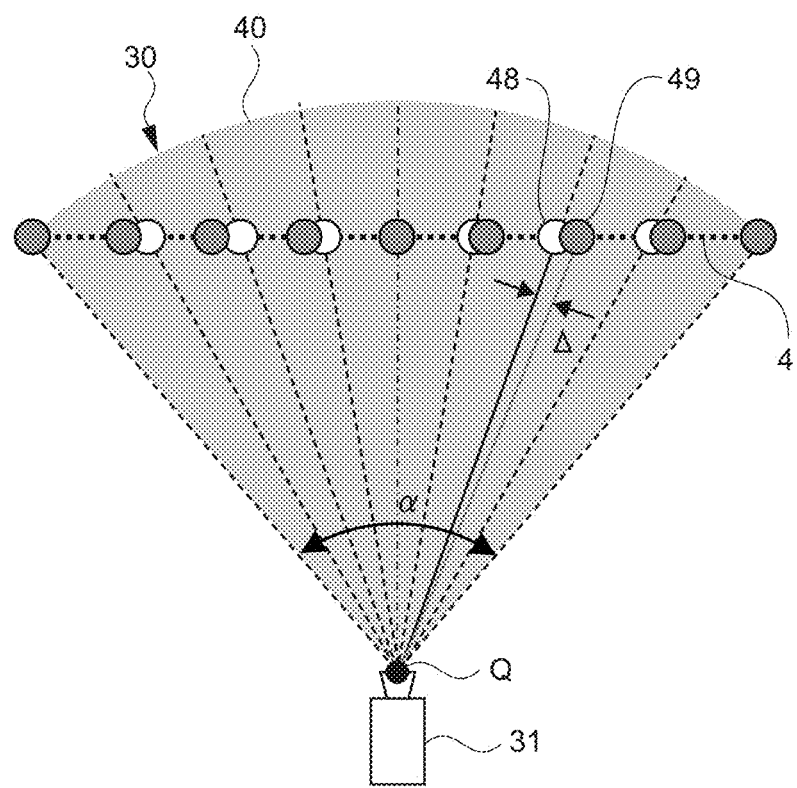
FIG. 14 is a schematic diagram showing a deviation between a direction in angle of view and a display direction.

If the individual image 32 is used as the display image 1 without correcting such a change in the angular pitch, there is a possibility that a deviation between the angular pitch in the cylindrical screen 15 and the angular pitch in the virtual space 30 becomes conspicuous (see FIG. 14).

In this regard, in the distortion correction processing, processing of correcting the above-mentioned imaging distortion (lens aberration distortion, volume distortion, or the like) and making the angular pitches equal to each other in the individual image 32 is executed.

For example, the individual image 32 is subjected to the image processing of correcting the imaging distortion, and the individual image 32 in which the imaging distortion has been corrected is subjected to the image processing of making the angular pitches equal to each other. The method of correcting the imaging distortion is not limited, and any method capable of correcting a lens aberration distortion or a volume distortion may be used, for example.

C of FIG. 10 illustrates the individual image 32 obtained after the correction in the distortion correction processing. In the corrected individual image 32, positions representing directions at equal intervals in the virtual space 30 can be represented as horizontal positions (vertical lines 46) at equal intervals. Further, when such a correction is performed, a lens aberration distortion (bobbin-shaped or barrel-shaped distortion), a volume distortion, or the like is also appropriately corrected.

This makes it possible to generate the display image 1, in which images without distortion are displayed, in a proper direction on the cylindrical screen 15.

Figure 11:
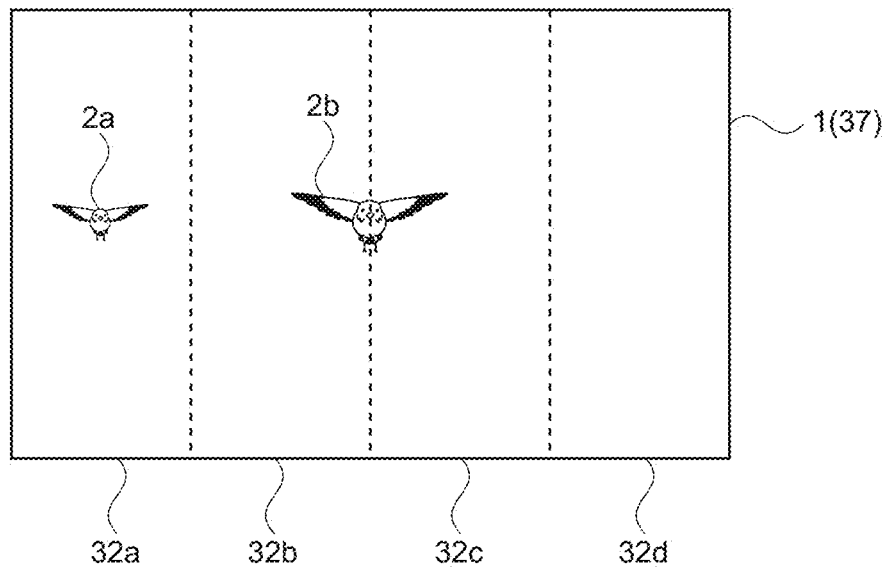
FIG. 11 is a schematic diagram showing an example of combining processing.

FIG. 11 is a schematic diagram showing an example of the combining processing.

The individual images 32, in each of which the imaging distortion has been corrected in the above-mentioned distortion correction processing, are combined as a single image. The combined image is the omnidirectional image 37 (display image 1).

In the example shown in FIG. 11, the individual images 32a to 32d shown in B of FIG. 8 are combined in this order. As a result, for example, the virtual object 2b imaged over the individual images 32b and 32c becomes a seamless image.

Note that, if the angles of view of the virtual cameras 31 overlap, the overlapping portions in the individual images 32 are trimmed at that time.

Figure 12:
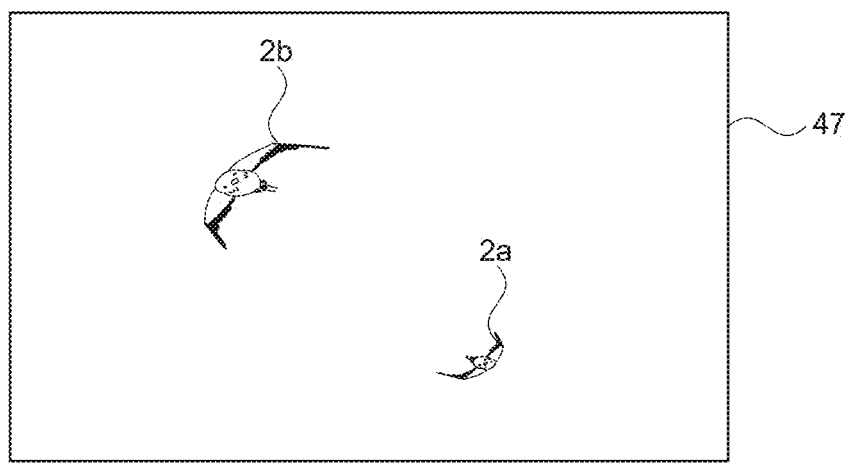
FIG. 12 is a schematic diagram showing an example of projection distortion conversion processing.

FIG. 12 is a schematic diagram showing an example of the projection distortion conversion processing.

Here, data (output data 47) representing a rectangular image projected by the image projection portion 13 toward the reflective mirror 14 is generated. The output data 47 is data obtained by deforming the omnidirectional image 37 (display image 1) in accordance with the optical system of the display portion 11. Specifically, the projection distortion corresponding to the optical system is applied to the omnidirectional image 37 by the projection distortion conversion.

FIG. 12 schematically illustrates an image represented by the output data 47 generated by performing the projection distortion conversion on the omnidirectional image 37 shown in FIG. 11. As shown in FIG. 12, the virtual objects 2 in the output data 47 are deformed, but the image is projected onto the cylindrical screen 15 via the reflective mirror 14, so that the virtual objects 2 are properly displayed on the outward display surface S.

Through those types of processing, seamless video content for a cylindrical display for outward display is created.

[Increased Number of Virtual Cameras]

As described above, in the individual image 32 captured by the virtual camera 31, the angular pitch of the direction in angle of view in the image plane 4 deviates. For that reason, in the distortion correction processing, the angular pitch is corrected together with the imaging distortion of the individual image 32.

Hereinafter, a configuration for reducing such an angular pitch deviation will be described.

Figure 13:
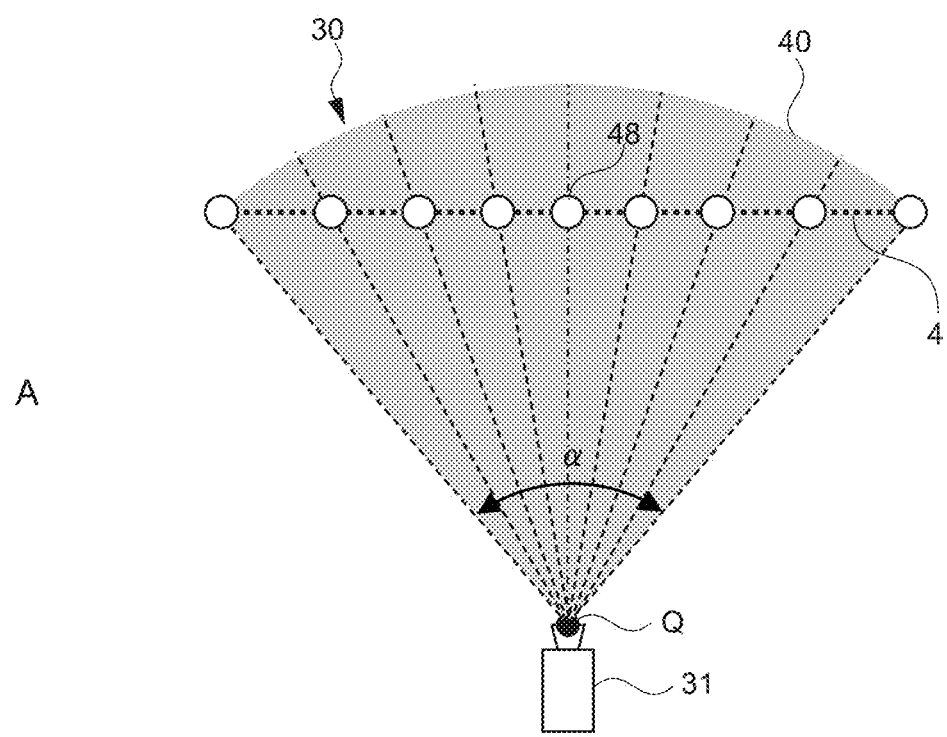
FIG. 13 is a schematic diagram showing a relationship between a direction in which a single virtual camera performs imaging and a direction displayed on a screen.
Figure 13:
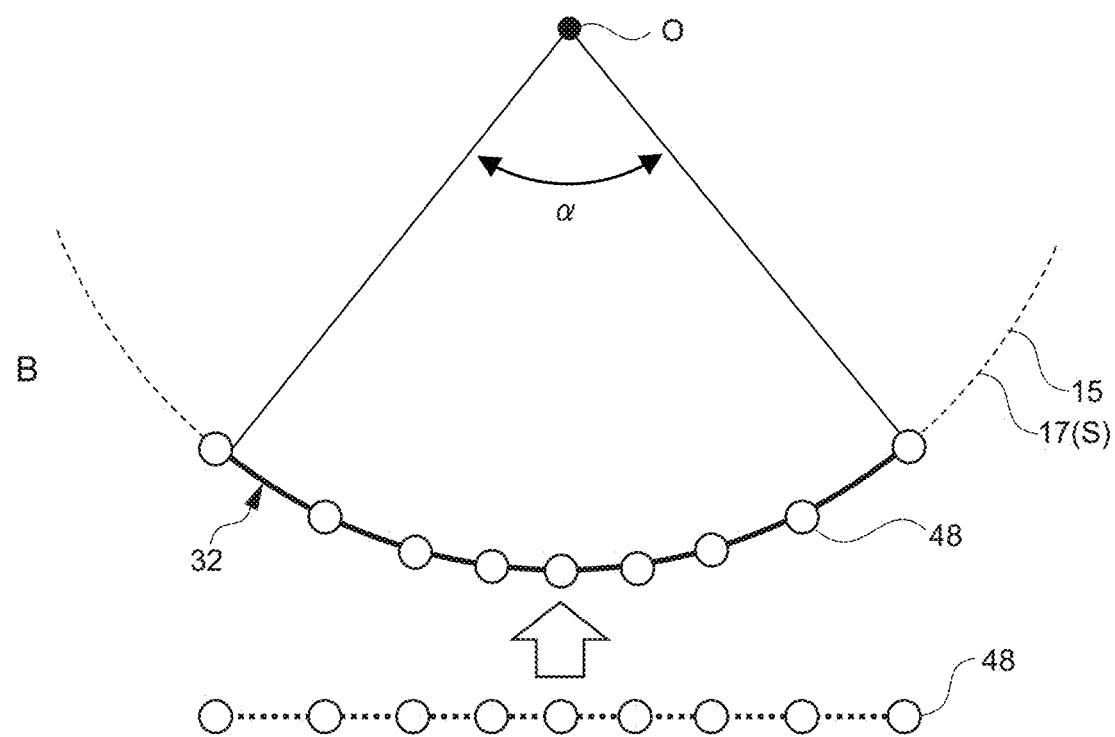

FIG. 13 is a schematic diagram showing a relationship between a direction in which a single virtual camera 31 performs imaging and a direction displayed on the screen 15.

A of FIG. 13 is a schematic diagram showing the angle-of-view range 40 (gray range) of the single virtual camera 31 having a horizontal angle of view α of approximately 90°. Here, positions on the image plane 4, in each of which the direction as viewed from the angle-of-view center Q (direction in angle of view) has an equal-angle pitch, are illustrated as white circles (hereinafter, referred to as imaging pitch positions 48).

As shown in A of FIG. 13, the image plane 4 is a plane having an equal depth as viewed from the virtual camera 31. Therefore, for example, when it is desired to display the virtual object 2 at an equal depth, the virtual object 2 needs to be disposed on the image plane 4. For example, setting the position of the virtual object 2 in such a way makes it possible to image the virtual object 2 in a state being in focus constantly.

On the other hand, as described with reference to FIG. 10, the angular pitches of the direction as viewed from the angle-of-view center Q with respect to the positions on the image plane 4 are not constant. Thus, the intervals between the imaging pitch positions 48 on the image plane 4 are not equal.

B of FIG. 13 is a schematic diagram showing a display range when the output (individual image 32) of the virtual camera 31 shown in A of FIG. 13 is displayed on the cylindrical screen 15 as it is. Such a display range is an angle range equal to the horizontal angle of view α of the virtual camera 31. Here, it is assumed that the individual image 32 is displayed on the cylindrical screen 15 without correcting the angular pitches in the image plane 4.

In this case, as shown in B of FIG. 13, the individual image 32 is displayed along the outer circumferential surface 17 of the screen 15 with irregular intervals between the imaging pitch positions 48. Thus, a deviation occurs between the direction as viewed from the angle-of-view center Q of the virtual camera 31 (direction in angle of view) and the direction as viewed from the central axis O of the screen 15 (display direction of the screen 15). Note that the directions coincide with each other at both ends and the center of the angle of view.

As described above, if an image captured by a wide-angle virtual camera 31 having a relatively wide horizontal angle of view α is directly displayed on the cylindrical surface, the direction of the camera within the angle of view does not coincide with the display angle. In this case, the image displayed on the screen 15 may be distorted. Further, the degree of distortion varies depending on the viewing angle. In addition, if processing of correcting such a distortion (distortion correction processing) is performed, the image quality of the display image 1 may deteriorate.

Further, since the angles of the capture space (virtual space 30) and the display space (real space) do not coincide with each other, the control of the virtual object 2 becomes complicated. For that reason, there is a possibility that processing in the case of moving the virtual object 2 along the screen 15, in the case of performing interaction control (see FIG. 24) of the virtual object 2, or in other cases becomes complicated.

FIG. 14 is a schematic diagram showing a deviation between a direction in angle of view and a display direction.

In FIG. 14, the positions at which the image plane 4 of the virtual camera 31 is divided at equal intervals in the horizontal direction are shown by gray circles. Those positions are positions corresponding to angular pitches at equal intervals when the image is displayed on the screen 15. Hereinafter, a position represented by a gray circle will be referred to as a display pitch position 49.

As shown in FIG. 14, within the angle of view of the virtual camera 31, the imaging pitch positions 48 and the display pitch positions 49 on the image plane 4 are deviated from each other except for the center and both ends of the angle of view. The amount of deviation between the imaging pitch position 48 and the display pitch position 49 differs depending on the position and is not constant.

Hereinafter, the maximum value of the amount of deviation between the imaging pitch position 48 and the display pitch position 49 will be referred to as a maximum angular deviation 4. FIG. 14 schematically illustrates an angular deviation corresponding to the angular deviation Δ. The maximum angular deviation Δ depends on the horizontal angle of view α of the virtual camera 31.

Further, the horizontal angle of view α of the virtual camera 31 is set according to, for example, the number of virtual cameras 31 constituting the camera unit 35.

Here, it is assumed that the horizontal angles of view α equal to each other are set for the plurality of virtual cameras 31 constituting the camera unit 35. In this case, the horizontal angle of view α is expressed as α=360°/N, where N is the number of virtual cameras 31.

Therefore, the maximum angular deviation Δ of each virtual camera 31 constituting the camera unit 35 depends on the number of virtual cameras 31 included in the camera unit 35.

Figure 15:
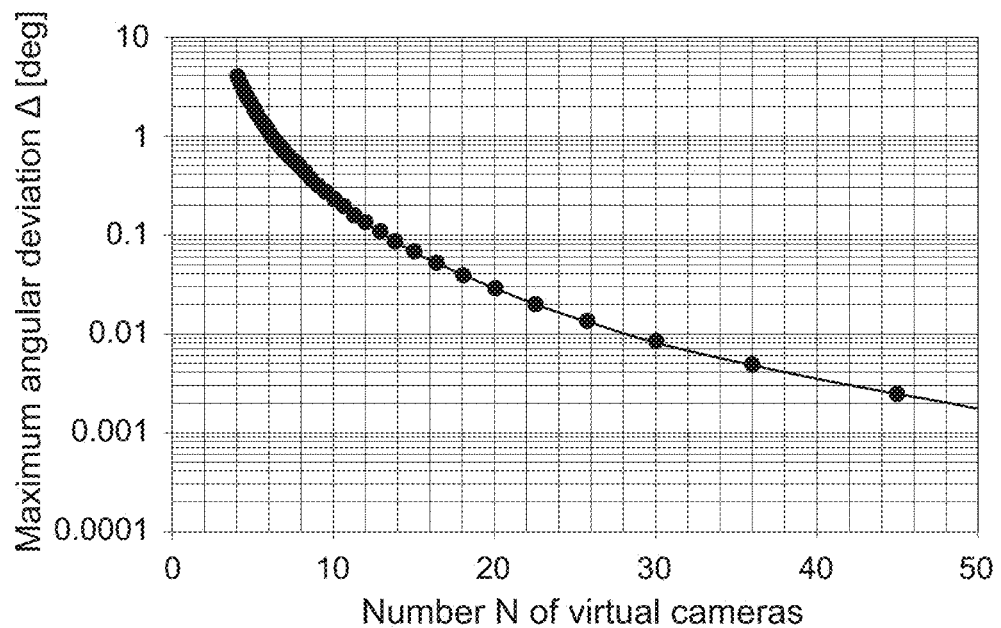
FIG. 15 is a graph showing a relationship between the number of virtual cameras constituting the camera unit and a maximum angular deviation Δ.

FIG. 15 is a graph showing the relationship between the number of virtual cameras 31 constituting the camera unit 35 and the maximum angular deviation Δ. The horizontal axis of the graph represents the number N of virtual cameras 31 constituting one camera unit 35. The vertical axis of the graph represents the maximum angular deviation Δ in one virtual camera 31, which is represented by a logarithmic scale.

As shown in FIG. 15, if the number of virtual cameras 31 is small, the horizontal angle of view α set for one virtual camera 31 increases, and the maximum angular deviation Δ increases. Conversely, as the number of virtual cameras 31 increases, the angle-of-view range (horizontal angle of view α) to be imaged by each virtual camera 31 becomes narrower, and the maximum angular deviation Δ decreases. As described above, increasing the number of virtual cameras 31 constituting the camera unit 35 makes it possible to reduce the deviation between the imaging pitch position 48 and the display pitch position 49, which occurs in each of the virtual cameras 31.

Figure 16:
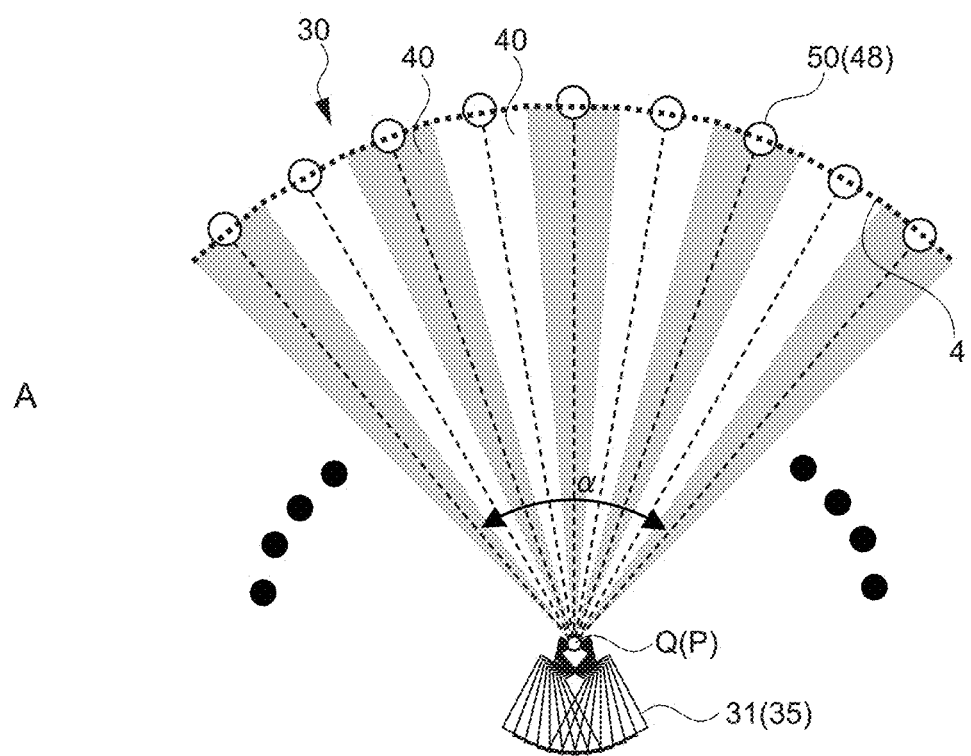
FIG. 16 is a schematic diagram showing a relationship between directions in which a large number of virtual cameras perform imaging and directions displayed on the screen.
Figure 16:
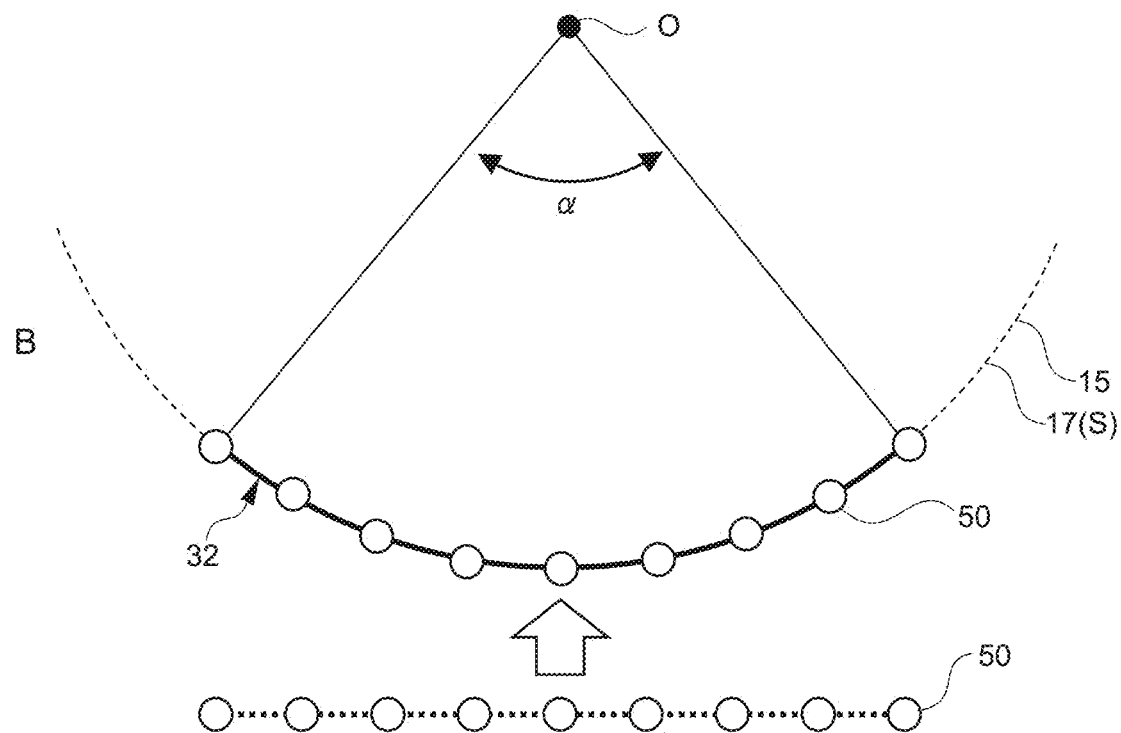

FIG. 16 is a schematic diagram showing the relationship between directions imaged by many virtual cameras 31 and directions displayed on the screen 15.

A of FIG. 16 is a schematic diagram showing the angle of view 40 of each virtual camera 31 in a camera unit 35 in which the number of virtual cameras 31 is increased. Here, the adjacent angle-of-view ranges 40 are color-coded using gray and white ranges.

Further, in this camera unit 35, eight virtual cameras 31 are used to image the horizontal angle of view α similar to that of the virtual camera 31 shown in FIG. 13. Therefore, the horizontal angle of view α of one virtual camera 31 is one eighth of that of the virtual camera shown in FIG. 13.

The image plane 4 of each virtual camera 31 is a strip-shaped plane orthogonal to the optical axis of the camera at a position separated from the imaging point P by a predetermined distance (for example, a focal length). Therefore, the image plane 4 of the entire camera unit 35 is a side surface of a regular polygonal prism with the imaging point P as the center.

A of FIG. 16 illustrates intersection positions 50 between the image plane 4 and the optical axes of the respective virtual cameras 31 by using white circles. The intervals between the intersection positions 50 are equal, and are each equal to the horizontal angle of view of each virtual camera 31.

Further, the intersection position 50 represents a position on the image plane 4 where the direction viewed from the imaging point P (angle-of-view center Q) has an equal angle pitch. In other words, the intersection position 50 can be regarded as the imaging pitch position 48 of the entire camera unit 35.

Note that the direction represented by each intersection position 50 shown in A of FIG. 16 corresponds to the direction represented by the imaging pitch position 48 shown in FIG. 13 or the like.

B of FIG. 16 is a schematic diagram showing a display range when the outputs (individual images 32) of the plurality of virtual cameras 31 shown in A of FIG. 16 are displayed on the cylindrical screen 15 as they are. Here, it is assumed that a display image 1 in which the plurality of individual images 32 is combined without correction is displayed on the cylindrical screen 15.

In this case, the imaging pitch positions 48 (intersection positions 50) of the entire camera unit 35 are located at equidistant positions along the outer circumferential surface 17 on the cylindrical screen 15 as well. Thus, there is almost no deviation between the imaging pitch positions 48 and the display pitch positions 49.

As described above, by increasing the number of virtual cameras 31 constituting the camera unit 35, the angle of view per virtual camera 31 is narrowed. As the angle of view is narrowed in such a manner, the deviation between the direction in angle of view and the display angle of the camera is sufficiently reduced. Further, since the angle of view of the camera is narrow, it is also possible to reduce the above-mentioned imaging distortion. As a result, it is possible to generate the display image 1 with less deterioration in image quality.

The number of virtual cameras 31 can be set on the basis of the relationship of the graph shown in FIG. 15.

Here, the horizontal angle of view $\alpha$ of the virtual camera 31 is considered in association with the interior angle width displayed on the cylindrical screen 15. For example, in a cylindrical screen 15 having a diameter q of 100 mm, if the pixel resolution is 200 ppi (pixels per inch), the interior angle width per pixel is 0.146 deg. Here, if the deviation of the images is set to 0.5 pixels or less, the maximum angular deviation $\Delta$ needs to be equal to or less than 0.073 deg. In this case, from the graph shown in FIG. 15, the number of virtual cameras 31 constituting the camera unit 35 is set to approximately 15 (horizontal angle of view of) 24° or less.

As described above, increasing the number of virtual cameras 31 on the basis of the relationship of the graph shown in FIG. 15 makes it possible to easily generate a video that can be reproduced with a desired image quality while controlling the deviation of the images.

[Trajectory of Virtual Object]

Hereinafter, the trajectory in the virtual space 30 when the virtual object 2 is moved will be described with reference to FIG. 17.

Figure 17:
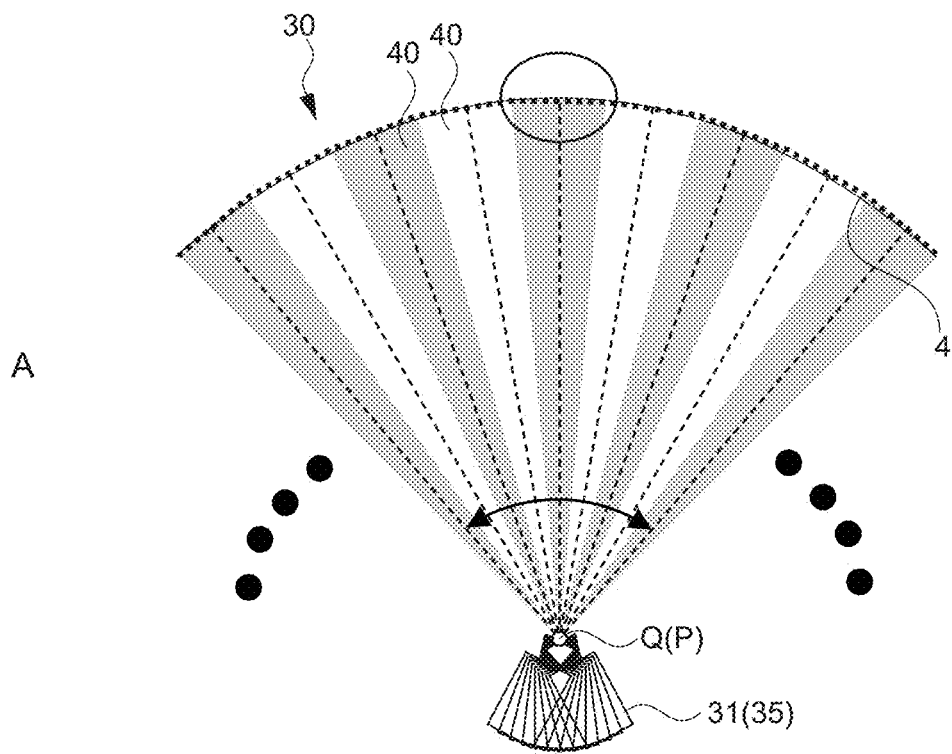
FIG. 17 is a schematic diagram showing a trajectory of a virtual object imaged by the camera unit.
Figure 17:
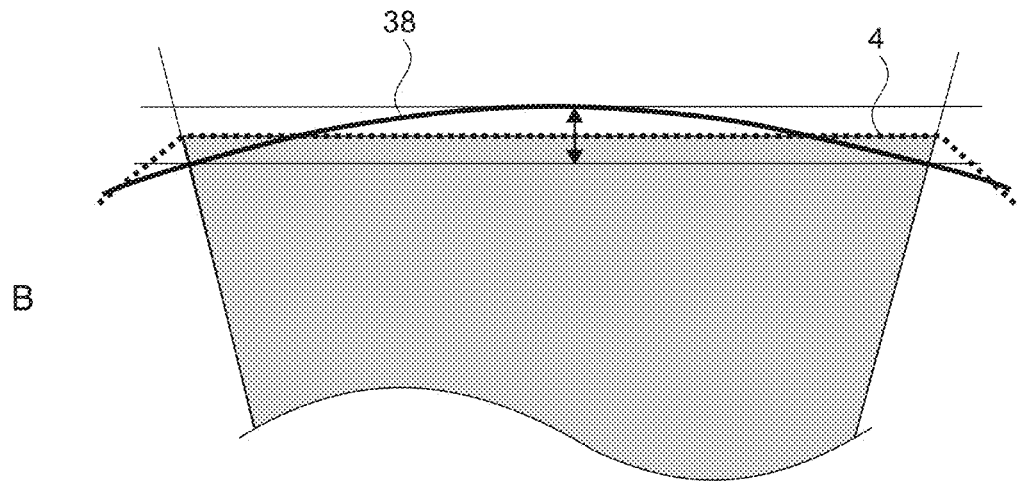

FIG. 17 is a schematic diagram showing a trajectory of the virtual object 2 imaged by the camera unit 35. A of FIG. 17 illustrates the image plane 4 of the camera unit 35 including many virtual cameras 31 as in A of FIG. 16. Further, B of FIG. 17 schematically illustrates an enlarged view of the vicinity of the image plane 4. This enlarged view is an enlarged view of an elliptical region shown in A of FIG. 17. B of FIG. 17 illustrates the image plane 4 of the virtual camera 31 by a thick dotted line, and the trajectory 38 of the virtual object 2 by a thick solid line.

When the virtual object 2 is displayed on the screen 15, if the distance between the image plane 4 of the virtual camera 31 and the virtual object 2 is deviated, the size on the screen 15 is changed.

For example, it is assumed that the virtual object 2 is displayed so as to move laterally (in the circumferential direction) along the cylindrical surface of the screen 15. In this case, in order to prevent the size of the virtual object 2 from changing, it is necessary to move the virtual object 2 on the trajectory along the image plane 4 of the virtual camera 31 as much as possible.

On the other hand, as shown in B of FIG. 17, the image plane 4 of the camera unit 35 (virtual camera 31) is a polygonal plane. Therefore, when the virtual object 2 is moved along the polygonal line along the image plane 4 as it is, a point at which the angle of the virtual object 2 abruptly changes (a point at which the angle of view is switched) appears. Thus, there is a problem that the processing of moving the virtual object 2 becomes complicated.

In this regard, in this embodiment, the virtual object 2 is controlled to move on the circumference with the imaging point P (angle-of-view center Q) as the center. At that time, the trajectory 38 of the virtual object 2 is set so as to minimize the difference from the image plane 4.

As described above, as the trajectory 38 for moving the virtual object 2, a circular trajectory whose radius is set so as to minimize the deviation from the image plane 4 of the camera unit 35 is used.

B of FIG. 17 schematically illustrates a part (thick solid line) of the circular trajectory 38. The radius of the trajectory 38 is set such that the distance between the trajectory 38 and the image plane 4 in the radial direction is minimized, for example.

In this case, for example, an intermediate value of the radii of the inscribed circle and the circumscribed circle with respect to the polygon forming the image plane 4 is set as the radius of the trajectory 38. The trajectory 38 of the virtual object 2 set in such a way is a circle passing through a position inwardly farthest from the image plane 4 at the boundary of the angles of view and passing through a position outwardly farthest from the image plane 4 at the center of the angles of view. At that time, the distance between the trajectory 38 and the image plane 4 is the same at the boundary and the center of the angles of view.

This minimizes the deviation between the trajectory 38 and the image plane 4 and makes it possible to sufficiently suppress the change in size when the virtual object 2 is displayed on the screen 15. Further, use of the circular trajectory 38 makes it possible to easily control the virtual object 2.

As described above, in the controller 21 according to this embodiment, the output of the camera unit 35 that performs imaging in all directions from the single imaging point P in the virtual space 30 is used to generate a display image 1 to be displayed on the outward display surface S that can be observed from all directions of the real space. As described above, use of the captured image 36 obtained by performing imaging in all directions of the virtual space 30 from one point makes it possible to easily generate content for the screen 15 (cylindrical display) capable of displaying images in all directions.

FIGS. 18 to 21 are schematic diagrams showing other methods of generating a video for cylindrical display as comparative examples. As the method of generating a video for cylindrical display using the virtual cameras 31, there are other several methods different from the present technology. Here, with reference to FIGS. 18 to 21, other methods of generating a video for cylindrical display using the virtual cameras 31 will be described.

Figure 18:
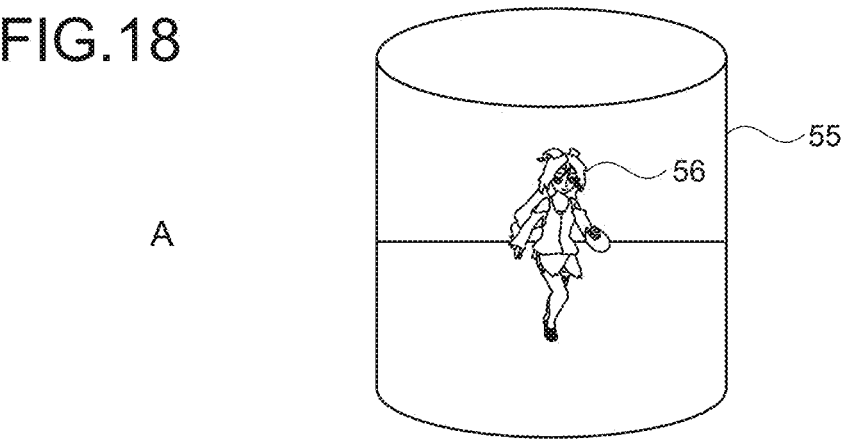
FIG. 18 is a schematic diagram showing another method of generating a video for cylindrical displaying exemplified as a comparative example.

In FIG. 18, an image captured by one virtual camera 31 is displayed so as to be wound around a cylindrical surface 55. In this case, the image captured by the virtual camera 31 is not an image obtained by performing imaging in all directions. Such images are wound around the cylindrical surface 55, and thus an object 56 can be displayed on the cylindrical surface 55 as shown in A of FIG. 18. On the other hand, a joint of the video is generated at a portion where the left and right ends of the angles of view come into contact with each other on the cylindrical surface 55. Thus, as shown in B of FIG. 18, there is a problem that the object 56 is unseen when the object 56 moves across the joint.

Figure 19:
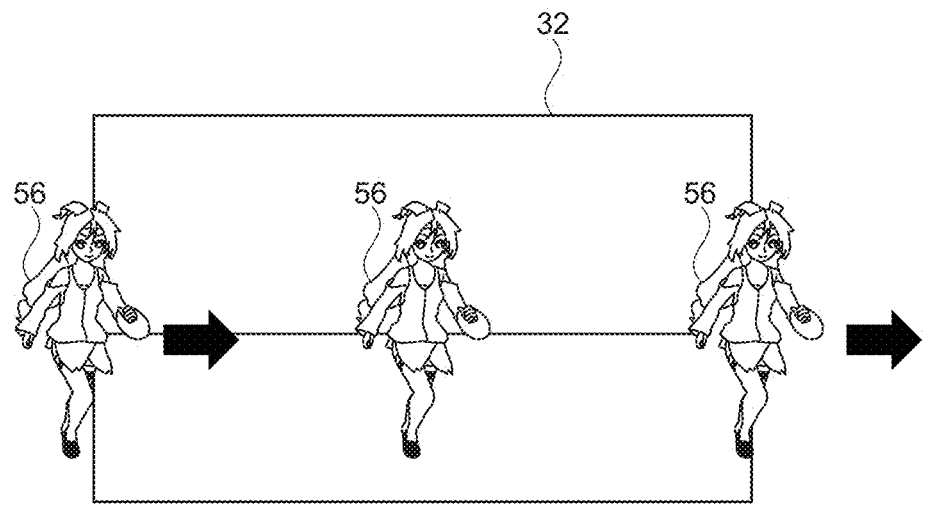
FIG. 19 is a schematic diagram showing another method of generating a video for cylindrical displaying exemplified as a comparative example.

FIG. 19 illustrates an example of processing for preventing the object 56 from being unseen. Here, control is executed such that a mirror (copy) of the object 56 is created, and when one of them disappears, the other appears. In this case, it is considered that the video processing load is heavy, and there is a possibility that the processing load becomes heavier when a large number of objects 56 are handled.

Figure 20:
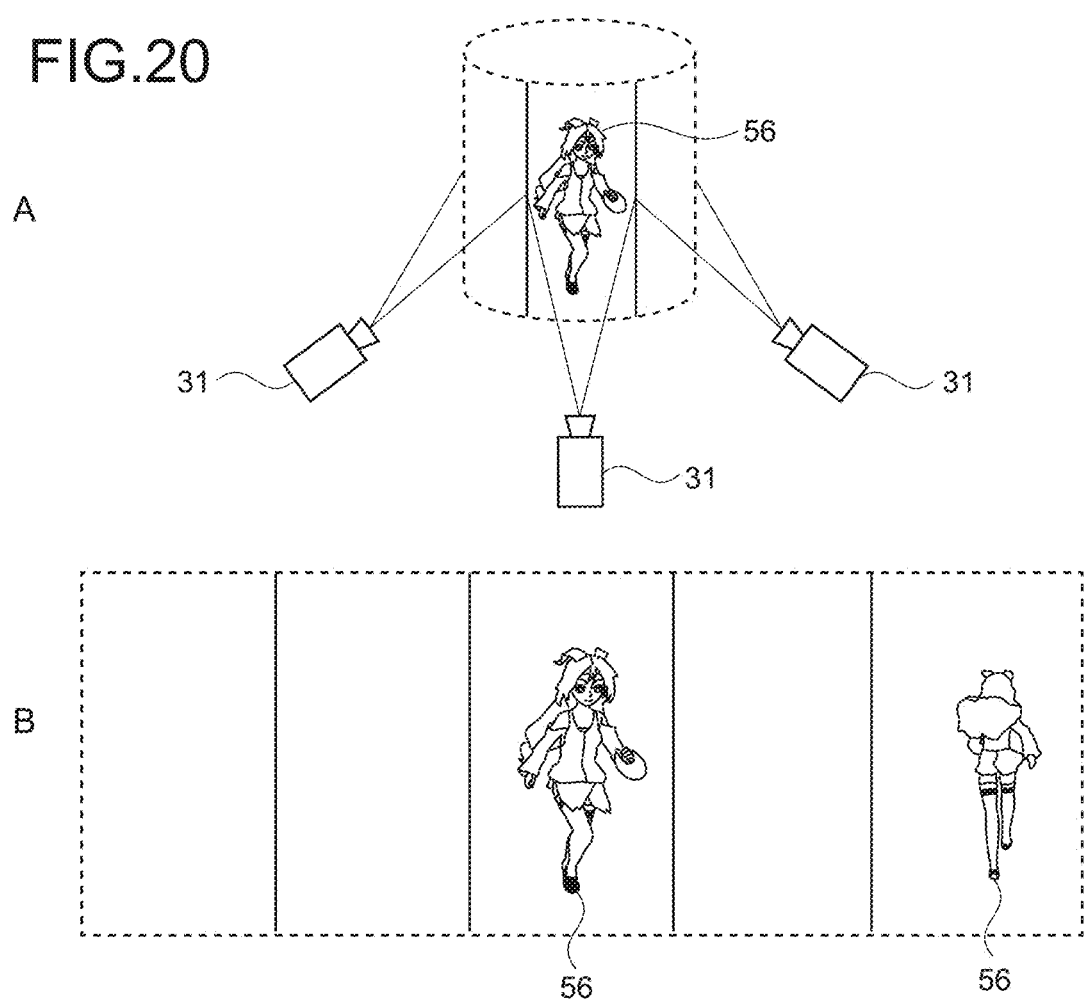
FIG. 20 is a schematic diagram showing another method of generating a video for cylindrical displaying exemplified as a comparative example.
Figure 21:
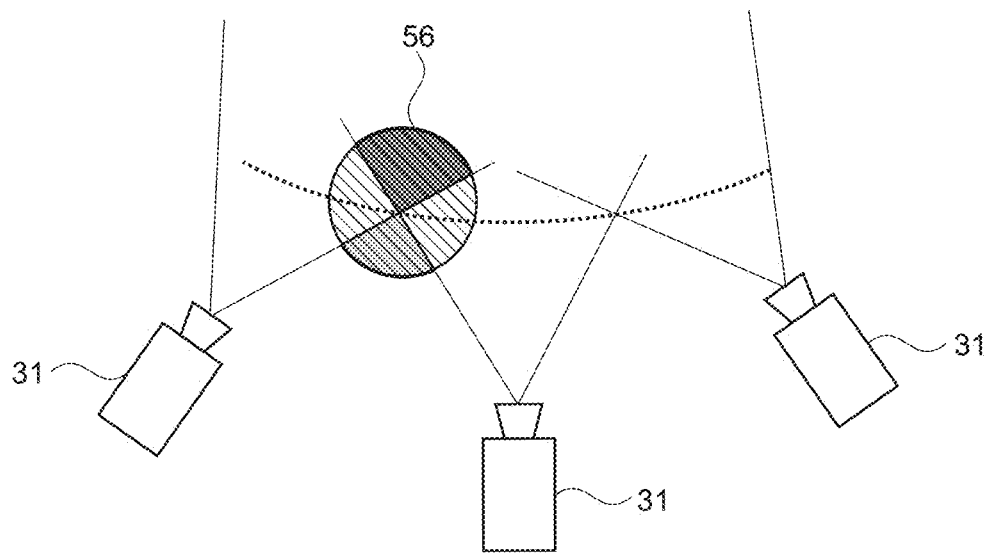
FIG. 21 is a schematic diagram showing another method of generating a video for cylindrical displaying exemplified as a comparative example.

In FIG. 20, a method is used in which a plurality of virtual cameras 31 is disposed on the circumference to image the object 56 so as to surround the object 56. A of FIG. 20 schematically illustrates a state in which the object 56 is imaged by the virtual cameras 31 disposed on the circumference. In this case, as shown in B of FIG. 20, an image of the same object 56 viewed from another direction may be captured in the plurality of virtual cameras 31. FIG. 21 illustrates the horizontal angles of view of the plurality of virtual cameras 31 disposed so as to surround a target. Here, it is assumed that an object 56 indicated by hatched regions is imaged. At that time, for example, in a region where the angles of view of the plurality of virtual cameras 31 overlap (dark gray region), the object 56 is imaged doubly. Further, for example, in a region where no angles of view overlap (light gray region), a portion that does not appear in any of the virtual cameras 31 occurs. For that reason, in the method of imaging the object 56 so as to surround the object 56, it is difficult to handle a thick three-dimensional object 56 or to dispose the objects 56 at different depths to perform imaging.

In contrast, in this embodiment, it is possible to easily generate cylindrical display content having no joint, which is suitable for the outward display (screen 15), by using a general-purpose environment in which the virtual camera 31 images the virtual object 2. In other words, by using the present technology, complicated processing such as copying processing as shown in FIG. 19 becomes unnecessary.

Further, in the camera unit 35 according to this embodiment, imaging in all directions of the virtual space 30 is performed such that the angles of view do not overlap with each other and a gap is not formed with the plurality of virtual cameras 31 being placed at the center. This avoids a situation in which the virtual object 2 is imaged doubly or in which a gap is formed in the angle of view. This makes it possible to easily image a connected video without gaps. Therefore, stereoscopic three-dimensional objects, the depth in the virtual space 30, and the like can be properly expressed.

Further, increasing the number of virtual cameras 31 in the camera unit 35, that is, decreasing the angle of view of each virtual camera 31 makes it possible to create a video with less deterioration in image quality.

For example, when the angle of view of the virtual camera 31 decreases, the imaging distortion decreases. Thus, it is not necessary to execute the distortion correction processing or the like for correcting the imaging distortion, and it is possible to reduce the calculation processing. Alternatively, the degree of correction can be reduced, and deterioration in image quality of the original image can be suppressed. This makes it possible to provide high-quality video content that can be displayed toward all directions.

Second Embodiment

A display apparatus of a second embodiment according to the present technology will be described. In the following description, descriptions of configurations and effects similar to those in the display apparatus 100 described in the above embodiment will be omitted or simplified.

Figure 22:
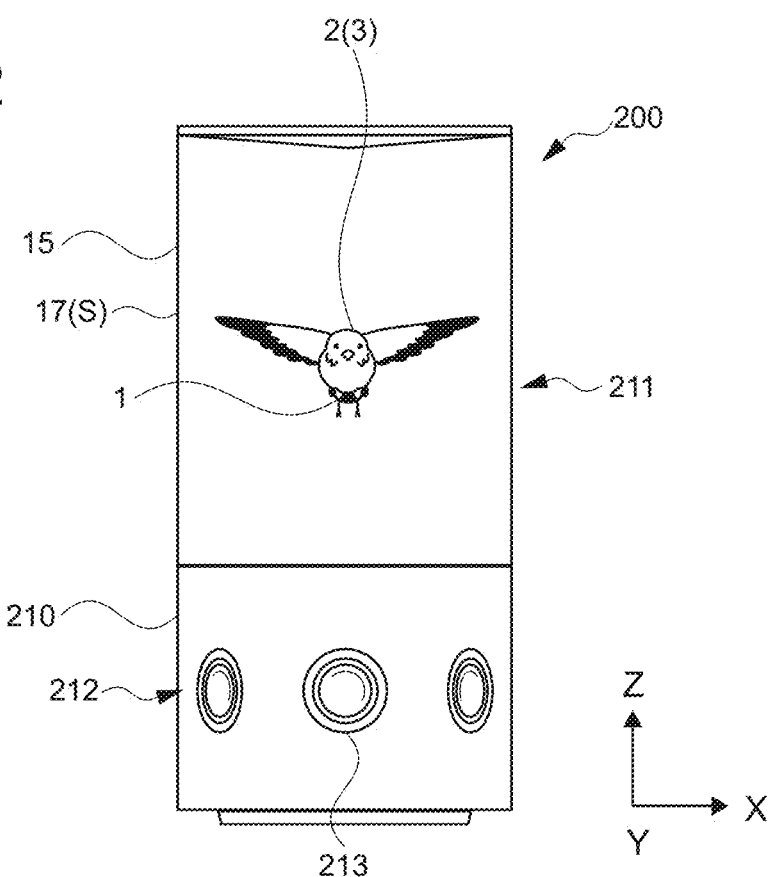
FIG. 22 is a schematic diagram showing a configuration example of a display apparatus according to a second embodiment.
Figure 23:
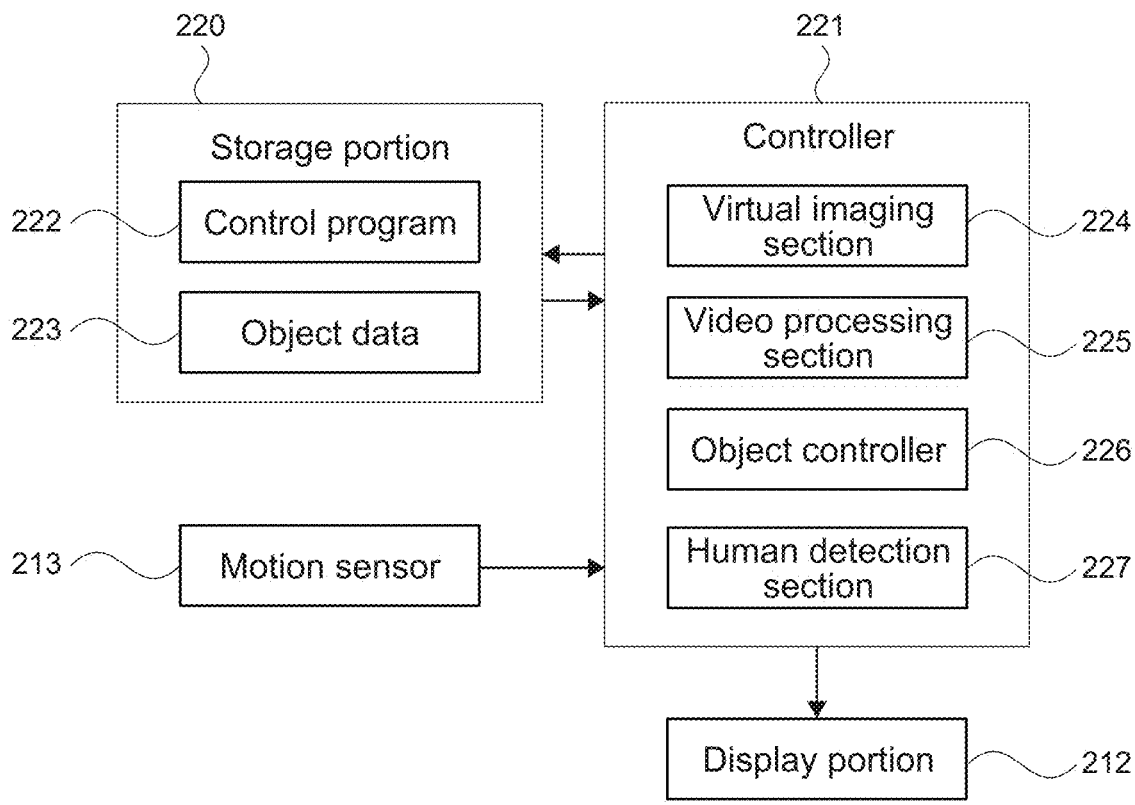
FIG. 23 is a block diagram showing a functional configuration example of the display apparatus shown in FIG. 22.

FIG. 22 is a schematic diagram showing a configuration example of a display apparatus according to the second embodiment. FIG. 23 is a block diagram showing a functional configuration example of a display apparatus 200 shown in FIG. 22. The display apparatus 200 according to this embodiment has an interaction function with an observer (user) who observes the apparatus, and performs control such as moving a virtual object 2 in accordance with the movement of the observer, for example.

As shown in FIG. 22, the display apparatus 200 includes a base portion 210, a display portion 211, and a motion sensor 212. The base portion 210 and the display portion 211 are configured in a manner similar to the base portion 10 and the display portion 11 of the display apparatus 100 shown in FIG. 1, for example. Therefore, it can be said that the display apparatus 200 has a configuration in which the motion sensor 212 is added to the display apparatus 100.

The motion sensor 212 is a sensor that detects an observer who observes a screen 15. Specifically, a sensor capable of detecting a direction in which an observer is present and a distance to the observer is used as the motion sensor 212.

In this embodiment, a plurality of camera sensors 213 that images the periphery of the display apparatus 200 is used as the motion sensor 212. In the example shown in FIG. 1, the plurality of camera sensors 213 is provided along the outer circumference on the side surface of the base portion 210 located on the lower side of the screen 15.

The camera sensors 213 are disposed so as to be capable of imaging the entire circumference (direction of) 360° of the display apparatus 200. For example, when the angle of view in the azimuth direction of one camera sensor 213 is 60°, six camera sensors 213 are disposed at equal intervals on the side surface of the base portion 210.

The camera sensor 213 is, for example, an RGB camera that images a color image, and a digital camera including an image sensor such as a complementary metal-oxide semiconductor (CMOS) sensor or a charge coupled device (CCD) sensor is used.

Further, as the camera sensor 213, an infrared camera or the like that receives infrared rays and captures an infrared image may be used. In this case, an infrared light source is disposed on the side surface or the like of the display apparatus 200. This makes it possible to detect an observer with high accuracy.

The motion sensor 212 may be configured using other sensors without being limited to the camera sensor 213. For example, a pyroelectric sensor that detects an observer as a heat source, an ultrasonic sensor that detects an ultrasonic wave reflected by an observer, a ranging sensor such as a time-of-flight (ToF) sensor that measures a distance to an observer by a ToF method, a directional microphone that detects a voice or a moving sound of an observer, or the like may be used. Further, those sensors may be used alone, or a plurality of types of sensors may be used in combination.

In this embodiment, such a plurality of motion sensors 212 is disposed in an annular shape, and the position and action of a person in the entire circumference of the display apparatus 200 are monitored. Using such a monitoring result, the virtual object 2 is caused to perform a reaction in response to the position and action of the observer, which makes it possible to exhibit high interactivity.

As shown in FIG. 23, the display apparatus 200 further includes a storage portion 220 and a controller 221.

The storage portion 220 stores a control program 222 and object data 223.

The controller 221 includes a virtual imaging section 224, a video processing section 225, an object controller 226, and a human detection section 227 as functional blocks. The virtual imaging section 224, the video processing section 225, and the object controller 226 perform substantially the same processing as the virtual imaging section 24, the video processing section 25, and the object controller 26 shown in FIG. 2.

The human detection section 227 detects the direction of an observer on the basis of the output of the motion sensor 212 that detects an observer who observes the screen 15. In this embodiment, the position where the observer is present is detected on the basis of the video from the plurality of camera sensors 213, and the direction in which the observer is present is calculated on the basis of the detection result.

For example, in the display apparatus 200, a front position is set, and image processing or the like is executed with the front position as a reference. With this front position as a reference, the direction of the observer is calculated in a range of ±180° (or in a range of 0° to) 360°. In addition, a coordinate position in a plane orthogonal to the central axis O (XY plane) may be calculated as the information indicating the direction of the observer.

In such a manner, the behavior of the virtual object 2 is controlled in accordance with the direction of the observer, which is detected by the human detection section 227.

Figure 24:
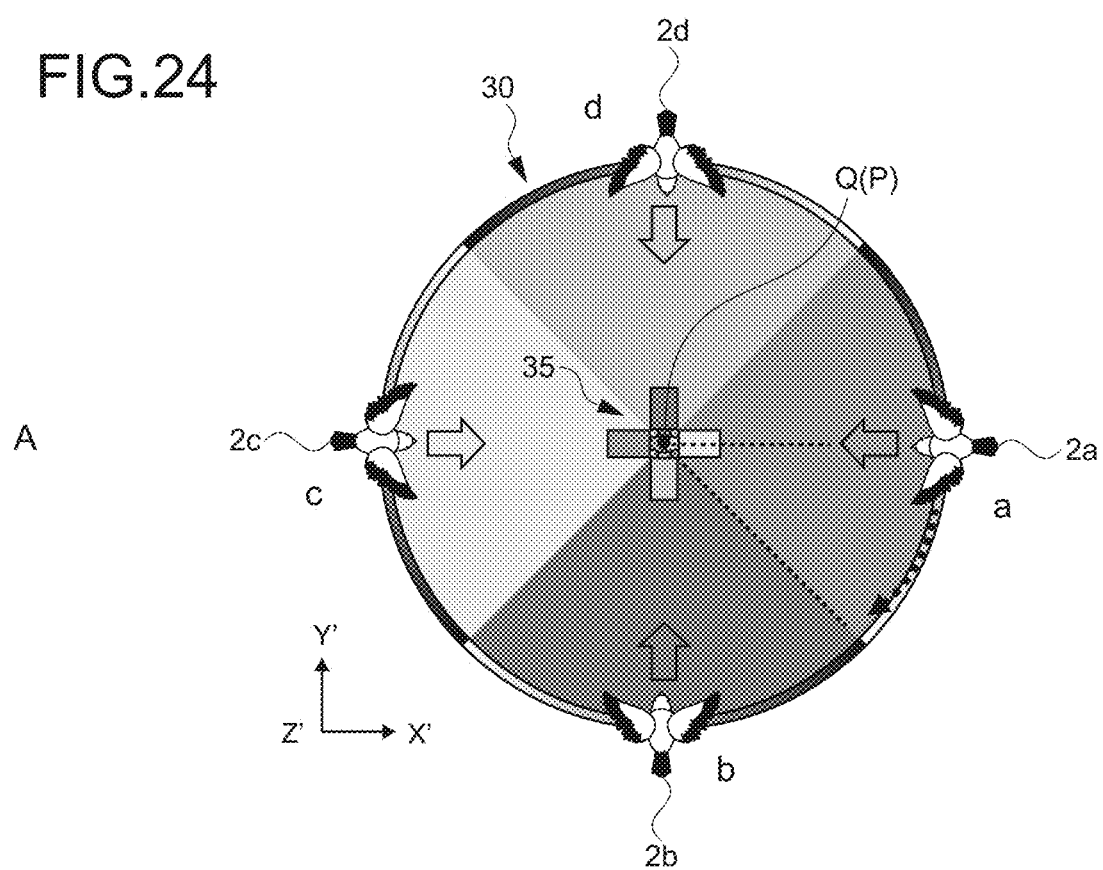
FIG. 24 is a schematic diagram showing an example of interaction control corresponding to a direction of an observer.
Figure 24:
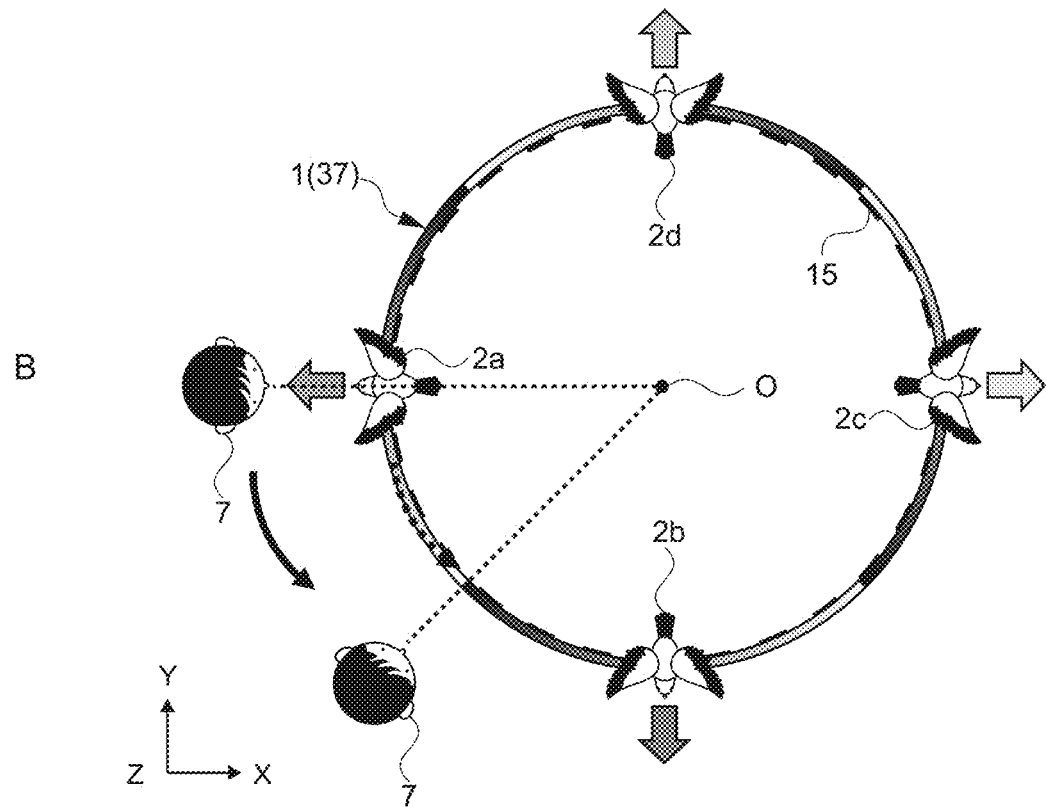

FIG. 24 is a schematic diagram showing an example of the interaction control according to the direction of the observer. Here, a method of controlling a display position (display direction) of a bird-shaped virtual object 2 in accordance with the movement of an observer 7 will be described.

A of FIG. 24 is a schematic diagram showing a state of imaging of a virtual object 2 by a camera unit 35. B of FIG. 24 is a schematic diagram showing a display direction of the virtual object 2 displayed on the screen 15.

As shown in A of FIG. 24, in the virtual space 30, virtual objects 2a to 2d are disposed on a circle around the imaging point P with the respective front surfaces thereof facing the imaging point P. The directions of the virtual objects 2a to 2d are 0° (rightward direction), 90° (downward direction), 180° (leftward direction), and 270° (upward direction), respectively.

The virtual objects 2a to 2d disposed in such a way are imaged by the camera unit 35, and an omnidirectional image 37 as viewed from the imaging point P in all directions of the virtual space 30 is generated. The omnidirectional image 37 is displayed on the screen 15 as a display image 1.

Consequently, as shown in B of FIG. 24, images obtained by imaging the four virtual objects 2a to 2d from the front are displayed at intervals of 90° along the entire circumference of the screen 15. Here, the display image 1 is displayed such that the display directions of the virtual objects 2a to 2d are 180° (leftward direction), 90° (downward direction), 0° (rightward direction), and 270° (upward direction), respectively.

Here, it is assumed that the observer 7 observes the screen 15 from the left direction in the drawing. The observer 7 observes an image viewed from the front of the virtual object 2a. The interaction control according to the direction of the observer 7 will be described.

In this embodiment, the direction of the observer 7 is monitored by the human detection section 227 on the basis of the output of the motion sensor 212 (camera sensor 213) described above. For example, the direction of the observer 7 located on the left side of the screen 15 is detected as 180°. Further, for example, when the observer 7 moves, the direction of the observer 7 who is moving is sequentially detected.

Here, as the interaction control, processing of moving the virtual object 2 such that the virtual object 2 is displayed in accordance with the direction of the observer 7 detected by the human detection section 227 is executed. For example, the virtual object 2 is moved such that the virtual object 2 is displayed in front of the observer 7. Alternatively, it is also possible to perform control such that the virtual object 2 is moved such that the virtual object 2 is displayed at a position shifted to the right side or the left side as viewed from the observer 7.

Those types of processing are executed by the object controller 226 on the basis of the detection result of the human detection section 227.

For example, as shown in B of FIG. 24, it is assumed that the observer 7 moves counterclockwise along the screen 15 in an direction of 180° to 135°. In accordance with this movement, the direction of the virtual object 2a in the virtual space 30 is changed such that the display direction of the virtual object 2a is a direction of 180° to 135° on the screen 15.

As shown in A of FIG. 24, the direction of the virtual object 2 in the virtual space 30 is changed to the direction of from 0° to 45°. In other words, in the virtual space 30, the virtual object 2 is moved clockwise.

Further, in the virtual space 30, the imaging point P (angle-of-view center Q) of the camera unit 35 corresponds to the front of the observer 7 in the real space. Therefore, the direction of the virtual object 2a in the virtual space 30 is changed with the front of the virtual object 2a facing the imaging point P.

As described above, when the virtual object 2a is moved counterclockwise on the screen 15, the virtual object 2a needs to be moved clockwise in the virtual space 30. Further, when the virtual object 2a is conversely moved clockwise on the screen 15, the virtual object 2a needs to be moved counterclockwise in the virtual space 30.

In other words, when the omnidirectional image 37 captured from the imaging point is rewound outwardly and displayed, the angular coordinates are reversed. Thus, when the virtual object 2 is moved in accordance with the direction of the observer 7, reverse control is performed in which the rotation direction in the real space is reversed. This makes it possible to properly display the virtual object 2 in accordance with the movement of the observer 7.

Third Embodiment

Hereinabove, the description has been given on the method of arranging a background object using a background as the virtual object 2 as it is when a background is placed behind the virtual object 2 (see FIG. 6 and the like).

In this embodiment, a background screen in which a background corresponding to all directions is drawn is used as the background of the virtual object 2.

Figure 25:
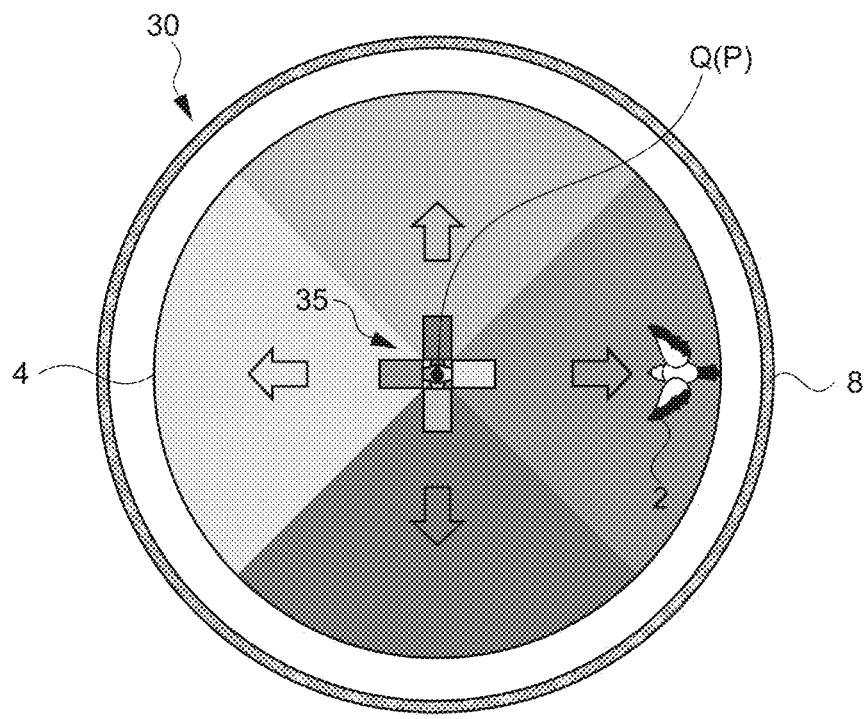
FIG. 25 is a schematic diagram showing a state of imaging using a background screen.

FIG. 25 is a schematic diagram showing a state of imaging using a background screen.

A background screen 8 is a cylindrical image object whose background is drawn on the inner surface, and is disposed around an imaging point P. FIG. 25 schematically illustrates the background screen 8, which is disposed in a virtual space 30, by an annular region. Note that the background screen 8 is an image object, and thus it is actually an object having no thickness.

The diameter of the background screen 8 is set to be larger than the diameter of an image plane 4 of a camera unit 35, for example. In the virtual space 30, the virtual object 2 is disposed inside the background screen 8 (for example, in the vicinity of the image plane 4), and imaging by the camera unit 35 is performed. This makes it possible to image the virtual object 2 together with the background.

In this embodiment, the background screen 8 corresponds to a screen object.

Figure 26:
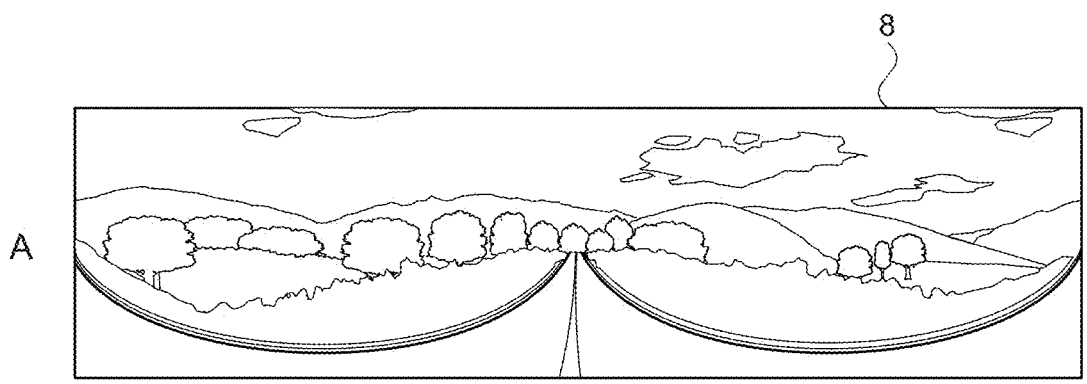
FIG. 26 is a schematic diagram showing an example of the background screen.
Figure 26:
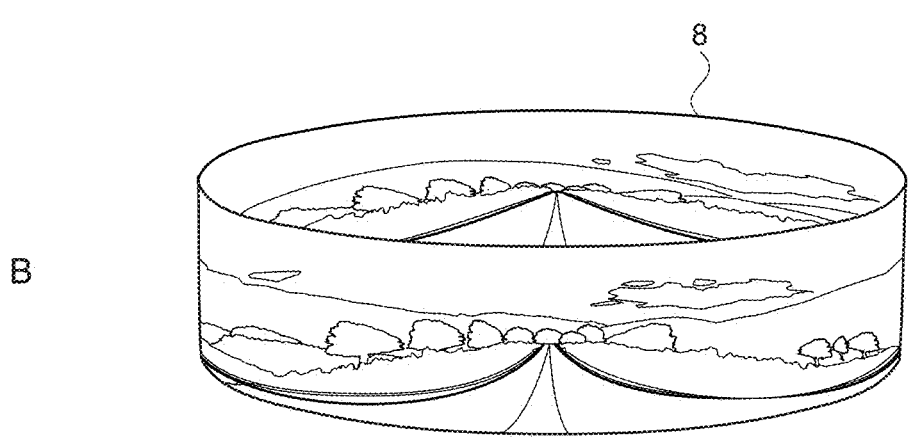

FIG. 26 is a schematic diagram showing an example of the background screen 8. A of FIG. 26 is a developed view of the background screen 8 developed in a plan view. By joining both ends of this developed view, a cylindrical background screen 8 as shown in B of FIG. 26 is formed.

Here, a scene obtained by performing imaging in all directions on a road surrounded by mountains and forests is drawn as a background. Therefore, for example, the road and the mountains and forests surrounding the road are visible in all directions from the center of the cylindrical background screen 8.

As a matter of course, the details of the background screen 8 are not limited, and any background may be used. For example, in the case of generating video content played by a virtual character, a background screen 8 obtained by imaging a stage of a concert hall may be used. Alternatively, in the case where a game character or the like is displayed, a background screen 8 obtained by imaging a game space or the like may be used.

As described above, in this embodiment, the cylindrical background screen 8 in which the background corresponding to all directions is drawn is disposed around the imaging point P. This makes it possible to easily generate video content having a background.

For example, in the imaging by the camera unit 35, the depth of the background is infinitely expanded. Thus, if an object or the like serving as a background is disposed in the virtual space 30, there is a possibility that the manufacturing of the background is troublesome.

In contrast, in this embodiment, a cylindrical background screen (screen object) is disposed in the virtual space 30, so that an omnidirectional background is expressed. This makes it possible to simplify the manufacturing of the background.

Other Embodiments

The present technology is not limited to the embodiments described above and can implement various other embodiments.

In the above description, the case where a cylindrical display is mainly used has been described. The shape of the display is not limited, and a display with any shape that allows observation from all directions of the real space may be used.

Figure 27:
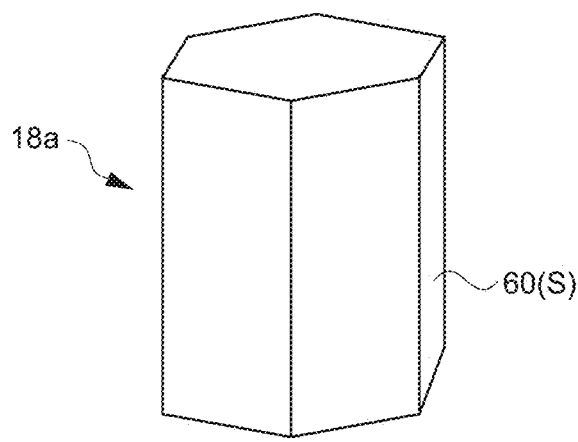
FIG. 27 is a schematic diagram showing configuration examples of a display according to another embodiment.
Figure 27:
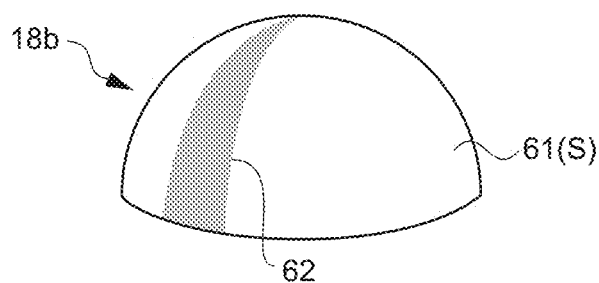
Figure 27:
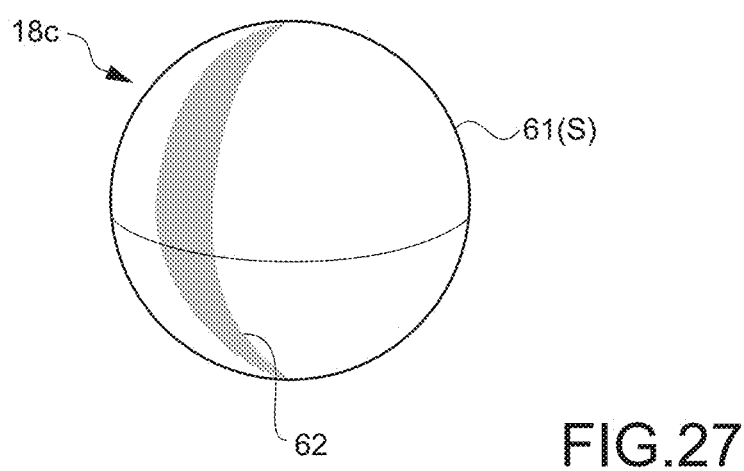

FIG. 27 is a schematic diagram showing configuration examples of a display according to another embodiment.

A of FIG. 27 schematically illustrates an outer shape of a display 18*a* formed in a polygonal prism shape. In such a manner, the display of the display apparatus may be a polygonal prism-shaped display 18*a*.

In the polygonal prism-shaped display 18*a*, an outer side surface 60 directed outwardly becomes an outward display surface S. In this case, an observer can observe a display image 1 displayed on the outer side surface 60 from all directions.

Further, as described above, in the present technology, the number of virtual cameras 31 constituting the camera unit 35 can be arbitrarily set. Therefore, even when the polygonal prism-shaped display 18*a* is used, the number of virtual cameras 31 constituting the camera unit 35 can be set to be larger than the number of side surfaces of the polygonal prism-shaped display 18*a*. In this case, it is not necessary to correct the angular pitch or the like as described with reference to FIG. 13. Note that the correction of the imaging distortion is performed.

For example, in the example shown in A of FIG. 27, the display 18*a* forms a hexagonal prism. In this case, the camera unit 35 includes at least seven or more virtual cameras 31 (for example, the number of virtual cameras 31 is a multiple of six, which is the number of side surfaces). As a result, a plurality of virtual cameras 31 is set per side surface. As described above, use of a larger number of virtual cameras 31 than the number of display surfaces makes it possible to achieve a polygonal prism-shaped display in which an imaging distortion and the like are sufficiently suppressed.

B of FIG. 27 and C of FIG. 27 schematically illustrate the outer shapes of displays 18*b* and 18*c* formed into hemispherical and spherical shapes, respectively. In such a manner, the display of the display apparatus may be the hemispherical display 18*b* or the spherical display 18*c*.

In the hemispherical and spherical displays 18*b* and 18*c*, an outer circumferential surface 61 formed into a spherical shape and directed outwardly is an outward display surface S. In this case, the observer can observe the display image 1 displayed on the outer circumferential surface 61 from all directions.

Note that the direction in the hemispherical and spherical displays 18*b* and 18*c* is an direction viewed from the center of the sphere in a reference plane passing through the center of the sphere. In the hemispherical display 18*b*, a circular cross section in the hemisphere serves as a reference plane. Further, in the spherical display 18*c*, any cut surface passing through the center serves as a reference plane. Each of the displays 18*a* and 18*b* is typically disposed such that the reference plane is disposed along the horizontal direction.

When the hemispherical and spherical displays 18*b* and 18*c* are used, the display size changes when the elevation angle (the vertical angle with respect to the reference plane) changes. For example, as the elevation angle becomes larger, the image size that can be displayed (display range 62) becomes smaller. B of FIG. 27 and C of FIG. 27 each schematically illustrate a display range 62, in which an individual image 32 of the virtual camera 31 is displayed, by a gray region.

In accordance with such a change in the display range 62 in the elevation angle direction, the angle of view of the virtual camera 31 mounted on the camera unit 35 is adjusted. Specifically, the horizontal angle of view is set to be smaller as the perpendicular imaging angle (elevation angle as viewed from the imaging point P) becomes larger. Alternatively, the horizontal angle of view may be set to a constant value, and the overlapping portions may be trimmed by post-processing.

In the virtual space 30, the virtual camera 31 in which the angle of view is set as described above is disposed while changing the angle along the horizontal direction with the angle-of-view center Q being as the center of the sphere (imaging point P). As a result, the camera unit 35 that captures an omnidirectional image 37 suitable for the hemispherical surface or spherical surface is formed.

Note that the virtual cameras 31 may also be arranged in the perpendicular direction as in the horizontal direction. In other words, the plurality of virtual cameras 31 may be arranged such that the angle-of-view centers Q overlap with each other toward different elevation angles. This makes it possible to capture a high-quality all-sky image or global image, or the like and display it on the hemispherical and spherical displays 18*b* and 18*c*.

In the above description, the camera unit configured by using a plurality of virtual cameras has been described. The present technology is not limited to the above. For example, one virtual camera that performs imaging in all directions may be used as the camera unit.

In other words, the camera unit includes a single virtual camera 31 capable of performing imaging in all directions of the virtual space viewed from the imaging point P. In such a manner, use of a single virtual camera makes it possible to simplify the imaging processing and reduce the processing load.

In addition, the configuration of the camera unit is not limited, and for example, a virtual camera including a fisheye lens or the like that images the whole sky may be used.

In the above description, a single controller has been exemplified as an embodiment of the information processing apparatus according to the present technology. However, the information processing apparatus according to the present technology may be achieved by any computer configured separately from the controller and connected to the controller via a wire or wireless communication. For example, an information processing method according to the present technology may be executed by a cloud server. Alternatively, the information processing method according to the present technology may be performed by the controller and another computer that operate cooperatively.

In other words, the information processing method and the program according to the present technology can be executed not only in a computer system composed of a single computer but also in a computer system in which a plurality of computers operates in conjunction with each other. Note that, in the present disclosure, a system means a collection of a plurality of constituent elements (apparatuses, modules (components), and the like), and whether or not all the constituent elements are in the same housing is not limited. Therefore, a plurality of apparatuses accommodated in separate housings and connected to each other through a network, and a single apparatus in which a plurality of modules is accommodated in a single housing are both the system.

The execution of the information processing method and the program according to the present technology by a computer system include, for example, both a case where the acquisition of a captured image, the generation of a display image, and the like are executed by a single computer and a case where each process is executed by a different computer. Further, the execution of each process by a predetermined computer includes causing another computer to execute a part or all of the process and acquiring a result thereof.

In other words, the information processing method and the program according to the present technology are also applicable to a configuration of cloud computing in which a single function is shared and cooperatively processed by a plurality of apparatuses through a network.

At least two of the characteristic portions according to the present technology described above can be combined. In other words, the various characteristic portions described in the embodiments may be arbitrarily combined without distinguishing between the embodiments. Further, the various effects described above are not limitative but are merely illustrative, and other effects may be provided.

In the present disclosure, "same", "equal", "orthogonal", and the like are concepts including "substantially the same", "substantially equal", "substantially orthogonal", and the like. For example, the states included in a predetermined range (e.g., range of ±10%) with reference to "completely the same", "completely equal", "completely orthogonal", and the like are also included.

Note that the present technology may also take the following configurations.

(1) An information processing apparatus, including:
  an image acquisition section that acquires a captured image, the captured image being captured by a camera section that performs imaging in all directions from a single imaging point in a virtual space; and
  an image generation section that generates, on the basis of the captured image, a display image to be displayed on a display including an outward display surface capable of being observed from all directions of a real space.

(2) The information processing apparatus according to (1), in which
  the image generation section generates, on the basis of the captured image, an omnidirectional image in which the virtual space is imaged in all the directions from the imaging point, and uses the omnidirectional image as the display image.

(3) The information processing apparatus according to (1) or (2), in which
  the display is a cylindrical display or a polygonal prism-shaped display.

(4) The information processing apparatus according to any one of (1) to (3), in which
  the camera section includes a plurality of virtual cameras disposed such that angle-of-view centers of the plurality of virtual cameras coincide with the imaging point and directed in directions different from each other.

(5) The information processing apparatus according to (4), in which
  angle-of-view ranges of the plurality of virtual cameras are set to be prevented from overlapping with each other.

(6) The information processing apparatus according to (4) or (5), in which
  the image acquisition section acquires a plurality of individual images captured by the plurality of virtual cameras as the captured images, and
  the image generation section combines the plurality of individual images to generate an omnidirectional image in which the virtual space is imaged in all the directions from the imaging point.

(7) The information processing apparatus according to (6), in which
  the image generation section corrects an imaging distortion for each of the plurality of individual images and combines the plurality of individual images in each of which the imaging distortion is corrected.

(8) The information processing apparatus according to any one of (1) to (7), in which
  the display is a polygonal prism-shaped display, and
  the number of the plurality of virtual cameras is larger than the number of side surfaces of the polygonal prism-shaped display.

(9) The information processing apparatus according to any one of (1) to (8), further including
  an object controller that controls at least one virtual object disposed in the virtual space.

(10) The information processing apparatus according to (9), in which the object controller moves the virtual object along a trajectory set with the imaging point as a reference.

(11) The information processing apparatus according to (10), in which
the trajectory is a circular trajectory having a radius that is set to minimize a deviation from an image plane of the camera section.

(12) The information processing apparatus according to any one of (9) to (11), in which
the at least one virtual object includes at least one of a character object or a background object.

(13) The information processing apparatus according to any one of (9) to (12), in which
the object controller disposes a cylindrical screen object in which a background corresponding to all the directions is drawn with the imaging point as the center.

(14) The information processing apparatus according to any one of (1) to (13), further including
a detector that detects, on the basis of an output of a motion sensor that detects an observer who observes the display, a direction of the observer, in which
the object controller moves the virtual object such that the virtual object is displayed in accordance with the direction of the observer.

(15) The information processing apparatus according to (14), in which
the motion sensor includes at least one of a camera sensor, an infrared sensor, a pyroelectric sensor, an ultrasonic sensor, a time-of-flight (ToF) sensor, or a directional microphone.

(16) The information processing apparatus according to (1) or (2), in which
the display is a hemispherical display or a spherical display.

(17) The information processing apparatus according to (1) or (2), in which
the camera section includes a single virtual camera capable of performing imaging in all directions of the virtual space as viewed from the imaging point.

(18) An information processing method, which is executed by a computer system, the method including:
acquiring a captured image, the captured image being captured by a camera section that performs imaging in all directions from a single imaging point in a virtual space; and
generating, on the basis of the captured image, a display image to be displayed on a display including an outward display surface capable of being observed from all directions of a real space.

(19) A program, which causes a computer system to execute the steps of:
acquiring a captured image, the captured image being captured by a camera section that performs imaging in all directions from a single imaging point in a virtual space; and
generating, on the basis of the captured image, a display image to be displayed on a display including an outward display surface capable of being observed from all directions of a real space.

(20) A display apparatus, including:
a display that includes an outward display surface capable of being observed from all directions in a real space;
an image acquisition section that acquires a captured image, the captured image being captured by a camera section that performs imaging in all directions from a single imaging point in a virtual space; and
an image generation section that generates, on the basis of the captured image, a display image to be displayed on the display.

REFERENCE SIGNS LIST

S display surface
P imaging point
Q angle-of-view center
1 display image
2, 2a to 2d virtual object
3 character object
4 image plane
7 observer
8 background screen
11, 211 display portion
15 screen
17 outer circumferential surface
18a to 18b display
20, 220 storage portion
21, 221 controller
22, 222 control program
24, 224 virtual imaging section
25, 225 video processing section
26, 226 object controller
212 motion sensor
227 human detection section
30 virtual space
31, 31a to 31d virtual camera
32, 32a to 32d individual image
35 camera unit
36 captured image
37 omnidirectional image
38 trajectory
100, 200 display apparatus

What is claimed is:

1. An information processing apparatus, comprising:
an image acquisition section that acquires a captured image, the captured image being captured by a camera section that performs imaging in all directions from a single imaging point in a virtual space, wherein the camera section comprises a plurality of cameras, and wherein a number of the plurality of cameras is chosen to reduce a deviation between an imaging pitch position and a display pitch position; and
an image generation section that generates, on a basis of the captured image, a display image to be displayed on a display including an outward display surface capable of being observed from all directions of a real space.

2. The information processing apparatus according to claim 1, wherein
the image generation section generates, on a basis of the captured image, an omnidirectional image in which the virtual space is imaged in all the directions from the imaging point, and uses the omnidirectional image as the display image.

3. The information processing apparatus according to claim 1, wherein
the display is a cylindrical display or a polygonal prism-shaped display.

4. The information processing apparatus according to claim 1, wherein
the camera section includes a plurality of virtual cameras disposed such that angle-of-view centers of the plurality of virtual cameras coincide with the imaging point and directed in directions different from each other.

5. The information processing apparatus according to claim 4, wherein
angle-of-view ranges of the plurality of virtual cameras are set to be prevented from overlapping with each other.

6. The information processing apparatus according to claim 4, wherein
the image acquisition section acquires a plurality of individual images captured by the plurality of virtual cameras as the captured images, and
the image generation section combines the plurality of individual images to generate an omnidirectional image in which the virtual space is imaged in all the directions from the imaging point.

7. The information processing apparatus according to claim 6, wherein
the image generation section corrects an imaging distortion for each of the plurality of individual images and combines the plurality of individual images in each of which the imaging distortion is corrected.

8. The information processing apparatus according to claim 1, wherein
the display is a polygonal prism-shaped display, and
the number of the plurality of virtual cameras is larger than a number of side surfaces of the polygonal prism-shaped display.

9. The information processing apparatus according to claim 1, further comprising
an object controller that controls at least one virtual object disposed in the virtual space.

10. The information processing apparatus according to claim 9, wherein
the object controller moves the virtual object along a trajectory set with the imaging point as a reference.

11. The information processing apparatus according to claim 10, wherein
the trajectory is a circular trajectory having a radius that is set to minimize a deviation from an image plane of the camera section.

12. The information processing apparatus according to claim 9, wherein
the at least one virtual object includes at least one of a character object or a background object.

13. The information processing apparatus according to claim 9, wherein
the object controller disposes a cylindrical screen object in which a background corresponding to all the directions is drawn with the imaging point as a center.

14. The information processing apparatus according to claim 9, further comprising
a detector that detects, on a basis of an output of a motion sensor that detects an observer who observes the display, a direction of the observer, wherein
the object controller moves the virtual object such that the virtual object is displayed in accordance with the direction of the observer.

15. The information processing apparatus according to claim 14, wherein
the motion sensor includes at least one of a camera sensor, an infrared sensor, a pyroelectric sensor, an ultrasonic sensor, a time-of-flight (ToF) sensor, or a directional microphone.

16. The information processing apparatus according to claim 1, wherein
the display is a hemispherical display or a spherical display.

17. The information processing apparatus according to claim 1, wherein
the camera section includes a single virtual camera capable of performing imaging in all directions of the virtual space as viewed from the imaging point.

18. An information processing method, which is executed by a computer system, the method comprising:
acquiring a captured image, the captured image being captured by a camera section that performs imaging in all directions from a single imaging point in a virtual space, wherein the camera section comprises a plurality of cameras, and wherein a number of the plurality of cameras is chosen to reduce a deviation between an imaging pitch position and a display pitch position; and
generating, on a basis of the captured image, a display image to be displayed on a display including an outward display surface capable of being observed from all directions of a real space.

19. A program encoded onto a non-transitory computer-readable medium, which causes a computer system to execute the steps of:
acquiring a captured image, the captured image being captured by a camera section that performs imaging in all directions from a single imaging point in a virtual space, wherein the camera section comprises a plurality of cameras, and wherein a number of the plurality of cameras is chosen to reduce a deviation between an imaging pitch position and a display pitch position; and
generating, on a basis of the captured image, a display image to be displayed on a display including an outward display surface capable of being observed from all directions of a real space.

20. A display apparatus, comprising:
a display that includes an outward display surface capable of being observed from all directions in a real space;
an image acquisition section that acquires a captured image, the captured image being captured by a camera section that performs imaging in all directions from a single imaging point in a virtual space, wherein the camera section comprises a plurality of cameras, and wherein a number of the plurality of cameras is chosen to reduce a deviation between an imaging pitch position and a display pitch position; and
an image generation section that generates, on a basis of the captured image, a display image to be displayed on the display.

* * * * *